(12) United States Patent
Wakayama et al.

(10) Patent No.: US 12,544,923 B2
(45) Date of Patent: Feb. 10, 2026

(54) GENERATION OF OPERATION SEQUENCES INDICATING OPERATIONS TO BE EXECUTED BY A ROBOT EXECUTING A TASK AND PERIPHERAL EQUIPMENT THAT DELIVERS OR RECEIVES AN OBJECT RELATING TO THE TASK TO OR FROM THE ROBOT

(71) Applicant: NEC Corporation, Tokyo (JP)

(72) Inventors: Hisaya Wakayama, Tokyo (JP); Masatsugu Ogawa, Tokyo (JP); Takehiro Itou, Tokyo (JP); Mineto Satoh, Tokyo (JP); Hiroyuki Oyama, Tokyo (JP); Nobuharu Kami, Tokyo (JP)

(73) Assignee: NEC CORPORATION, Tokyo (JP)

( * ) Notice: Subject to any disclaimer, the term of this patent is extended or adjusted under 35 U.S.C. 154(b) by 316 days.

(21) Appl. No.: 17/799,984

(22) PCT Filed: Feb. 25, 2020

(86) PCT No.: PCT/JP2020/007420
§ 371 (c)(1),
(2) Date: Aug. 16, 2022

(87) PCT Pub. No.: WO2021/171350
PCT Pub. Date: Sep. 2, 2021

(65) Prior Publication Data
US 2023/0072244 A1 Mar. 9, 2023

(51) Int. Cl.
*B25J 9/16* (2006.01)
*G05B 19/418* (2006.01)

(52) U.S. Cl.
CPC ........ *B25J 9/1661* (2013.01); *G05B 19/4182* (2013.01); *G05B 19/41895* (2013.01); *G05B 2219/39102* (2013.01)

(58) Field of Classification Search
CPC ..... B25J 9/1661; B25J 13/00; G05B 19/4182; G05B 19/41895; G05B 2219/39102; G05B 2219/40113
See application file for complete search history.

(56) References Cited

U.S. PATENT DOCUMENTS 10,802,889 B1 * 10/2020 Ganesan ............... G06F 9/5005
2005/0276049 A1    12/2005 Van Den Nieuwelaar et al.
(Continued)

FOREIGN PATENT DOCUMENTS

JP    2005-340848 A    12/2005
JP    2017-039170 A    2/2017
(Continued)

OTHER PUBLICATIONS

Sahin, Y., et al., "Multirobot Coordination with Counting Temporal Logics," Oct. 2018, arXiv:1810.13087, pp. 1-16 (Year: 2018).*
(Continued)

*Primary Examiner* — Abby Lin
*Assistant Examiner* — Karston G. Evans
(74) *Attorney, Agent, or Firm* — Sughrue Mion, PLLC

(57) ABSTRACT

A control device 1C includes an operation sequence generation means 37C. The operation sequence generation means 37C is configured to generate, based on robot operation information Ir indicating operation characteristics of a robot executing a task and peripheral equipment information Ip indicating operation characteristics of peripheral equipment which delivers or receives an object relating to the task to or from the robot, operation sequences Sra and Spa indicating operations to be executed by the robot and the peripheral equipment, respectively.

9 Claims, 13 Drawing Sheets

(56) References Cited

U.S. PATENT DOCUMENTS

| | | | | |
|---|---|---|---|---|
| 2010/0082234 | A1* | 4/2010 | Ohta | G01C 21/3626 |
| | | | | 701/533 |
| 2016/0129592 | A1* | 5/2016 | Saboo | B25J 5/007 |
| | | | | 700/248 |
| 2017/0028558 | A1* | 2/2017 | Nishi | B25J 9/1666 |
| 2017/0050321 | A1* | 2/2017 | Look | G06Q 10/06398 |
| 2018/0085922 | A1 | 3/2018 | Ooba | |
| 2018/0178376 | A1* | 6/2018 | Lalonde | B25J 9/0084 |
| 2018/0281190 | A1 | 10/2018 | Kakisaka et al. | |
| 2019/0299401 | A1 | 10/2019 | Sugiyama | |
| 2019/0359424 | A1* | 11/2019 | Avraham | G06Q 10/08 |
| 2020/0047339 | A1 | 2/2020 | Sawada et al. | |
| 2020/0277139 | A1* | 9/2020 | Nakano | B65G 1/1373 |
| 2022/0143818 | A1* | 5/2022 | Niwa | B25J 9/16 |
| 2022/0212346 | A1* | 7/2022 | Toritani | B25J 9/1661 |
| 2023/0195083 | A1* | 6/2023 | Odegard | G05B 19/4182 |
| | | | | 700/230 |

FOREIGN PATENT DOCUMENTS

| | | |
|---|---|---|
| JP | 2018-051684 A | 4/2018 |
| JP | 2018-167361 A | 11/2018 |
| JP | 2019-177429 A | 10/2019 |
| JP | 2019-177434 A | 10/2019 |
| WO | 2018/194094 A1 | 10/2018 |
| WO | WO-2021171350 A1 * 9/2021 ............ B25J 9/1661 |

OTHER PUBLICATIONS

International Search Report for PCT Application No. PCT/JP2020/007420, mailed on Mar. 31, 2020.

* cited by examiner

GENERATION OF OPERATION SEQUENCES INDICATING OPERATIONS TO BE EXECUTED BY A ROBOT EXECUTING A TASK AND PERIPHERAL EQUIPMENT THAT DELIVERS OR RECEIVES AN OBJECT RELATING TO THE TASK TO OR FROM THE ROBOT

This application is a National Stage Entry of PCT/JP2020/007420 filed on Feb. 25, 2020, the contents of all of which are incorporated herein by reference, in their entirety.

TECHNICAL FIELD

The present invention relates to a technical field of a control device, a control method, and a storage medium for performing process related to a task to be executed by a robot.

BACKGROUND ART

There is proposed such a control method to perform control of a robot necessary for executing the task when a task to be performed by a robot is given. For example, Patent Literature 1 discloses a robot controller configured, when placing a plurality of objects in a container by a robot with a hand for gripping an object, to determine possible orders of gripping the objects by the hand and to determine the order of the objects to be placed based on the index calculated with respect to each of the possible orders.

CITATION LIST

Patent Literature

Patent Literature 1: JP 2018-51684A

SUMMARY

Problem to be Solved

When a robot executes a task, depending on the given task, it is necessary to deliver (pass or hand over) or receive an object to/from other devices. However, Patent Literature 1 is silent on the determination method of the operation to be executed by the robot in this case.

In view of the issues described above, one object of the present invention is to provide a control device, a control method, and a storage medium capable of suitably generating an operation sequence to be executed by a robot in view of the issues described above.

Means for Solving the Problem

In one mode of the control device, there is provided a control device including: an operation sequence generation means configured to generate, based on robot operation information indicating operation characteristics of a robot executing a task and peripheral equipment information indicating operation characteristics of peripheral equipment which delivers or receives an object relating to the task to or from the robot, operation sequences indicating operations to be executed by the robot and the peripheral equipment, respectively.

In one mode of the control method, there is provided a control method executed by a computer, the control method including: generating, based on robot operation information indicating operation characteristics of a robot executing a task and peripheral equipment information indicating operation characteristics of peripheral equipment which delivers or receives an object relating to the task to or from the robot, operation sequences indicating operations to be executed by the robot and the peripheral equipment, respectively.

In one mode of the storage medium, there is provided a storage medium storing a program executed by a computer, the program causing the computer to function as: an operation sequence generation means configured to generate, based on robot operation information indicating operation characteristics of a robot executing a task and peripheral equipment information indicating operation characteristics of peripheral equipment which delivers or receives an object relating to the task to or from the robot, operation sequences indicating operations to be executed by the robot and the peripheral equipment, respectively.

Effect

An example advantage according to the present invention is to suitably generate each operation sequence to be executed by a robot and its peripheral equipment which delivers or receives an object to/from the robot.

EXAMPLE EMBODIMENTS

Hereinafter, an example embodiment of a control device, a control method, and a storage medium will be described with reference to the drawings.

First Example Embodiment (1) System Configuration

Figure 1:
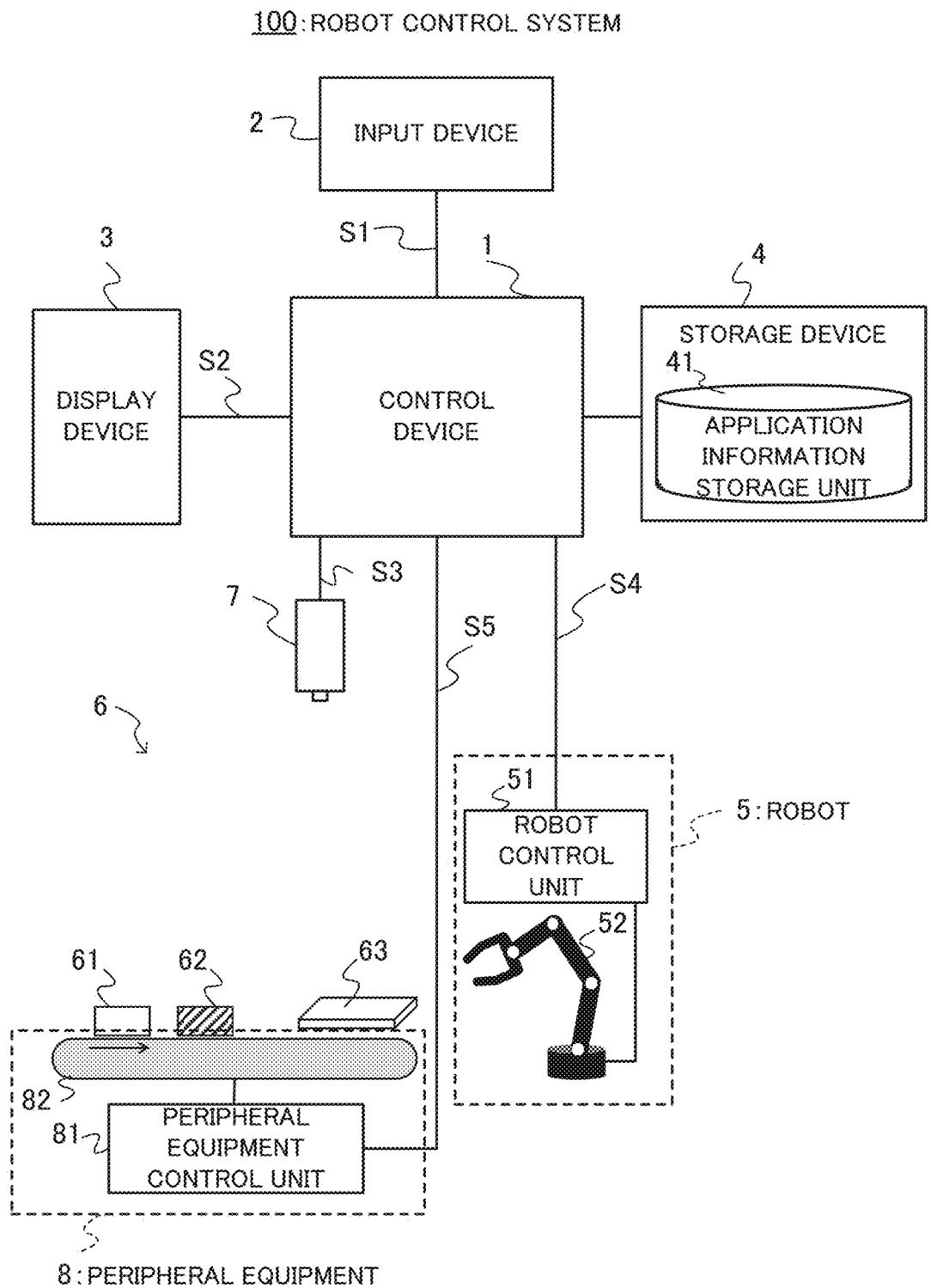
FIG. 1 illustrates the configuration of the robot control system.

FIG. 1 shows a configuration of a robot control system 100 according to the first example embodiment. The robot control system 100 mainly includes a control device 1, an input device 2, a display device 3, a storage device 4, a robot 5, a measurement device 7, and peripheral equipment 8.

In a case that a task (also referred to as "objective task") to be executed by the robot 5 and the peripheral equipment 8 is specified, the control device 1 generates operation sequences to be executed by the robot 5 and the peripheral equipment 8 for each time step (for each discrete time) and supplies the operation sequences to the robot 5 and the peripheral equipment 8, respectively. As will be described later, the operation sequences are configured by tasks or commands (also referred to as "subtasks") into which the objective task is decomposed by a unit that can be accepted by the robot 5 and the peripheral equipment 8, and are hereinafter referred to as "subtask sequences".

The control device 1 is electrically connected to the input device 2, the display device 3 and the storage device 4. For example, the control device 1 receives an input signal "S1" for specifying the objective task from the input device 2. Further, the control device 1 transmits, to the display device 3, a display signal "S2" for displaying information relating to the task to be executed by the robot 5. Further, the control device 1 transmits a control signal "S4" relating to the control of the robot 5 to the robot 5, and transmits a control signal "S5" relating to the control of the peripheral equipment 8 to the peripheral equipment 8. Furthermore, the control device 1 receives the output signal "S3" from the measurement device 7.

The input device 2 is an interface configured to accept the input from the user, and examples of the input device 2 include a touch panel, a button, a keyboard, and a voice input device. The input device 2 supplies the input signal S1 generated based on the user's input to the control device 1.

The display device 3 displays information based on the display signal S2 supplied from the control device 1 and examples of the display device 3 include a display and a projector. As will be described later, for example, the display device 3 displays, based on the display signal S2, an input view (also referred to as "task input view") for specifying information relating to the objective task.

The storage device 4 includes an application information storage unit 41. The application information storage unit 41 stores application information necessary for generating a subtask sequence from the given tasks. Details of the application information will be described later with reference to FIG. 3. The storage device 4 may be an external storage device such as a hard disk connected to or built in to the control device 1, or may be a storage medium such as a flash memory. The storage device 4 may be a server device that performs data communication with the control device 1 through a communication network. In this case, the storage device 4 may be configured by a plurality of server devices.

The robot 5 performs an operation based on the control signal S4 transmitted from the control device 1. The robot 5 shown in FIG. 1 is equipped with, as an example, a robot control unit 51 and a robot arm 52 capable of grasping an object. The robot arm 52 performs, under the control of the robot control unit 51, pick-and-place (picking-up and placing process) for placing the target object 61 to be conveyed by the peripheral equipment 8 in the destination area 63 without interfering with the obstacle 62 that is an object other than the target object 61. The robot control unit 51 performs operation control of the robot arm 52 based on the subtask sequence indicated by the control signal S4. Examples of the robots 5 include a vertically articulated robot, a horizontally articulated robot, and any other type of robot.

The measurement device 7 is configured to perform measurement whose target measurement range includes the workspace 6 where the robot 5 and the peripheral equipment 8 work and examples of the measurement device 7 include a camera, a laser range sensor, a sonar, and any combination thereof. The measurement device 7 supplies the generated output signal S3 to the control device 1. The output signal S3 may include image data taken in the workspace 6 or may include a point cloud data indicating the positions of objects in the workspace 6.

The peripheral equipment 8 performs operation based on the control signal S5 transmitted from the control device 1. The peripheral equipment 8 shown in FIG. 1 is equipped with, as an example, a peripheral equipment control unit 81 and a conveyor 82 capable of transporting an object. The conveyor 82 carries, under the control of the peripheral equipment control unit 81, the target object 61 and the obstacle 62 and the like. The peripheral equipment control unit 81 performs operation control of the conveyor 82 based on the subtask sequence indicated by the control signal S5. Examples of the peripheral equipment 8 include an AGV (Automated Guided Vehicle), a slider, and a conveyor capable of transporting objects in a predetermined direction or in plural directions. Further, the peripheral equipment 8 may be equipment configured to move a container or a shelf containing the target object 61.

The configuration of the robot control system 100 shown in FIG. 1 is an example, and various changes may be applied to the configuration. For example, the robot 5 may be configured by plural robots. The robot 5 may also include two or more robot arms 52. Even in these cases, the control device 1 generates a subtask sequence to be executed by each robot arm 52 based on the objective task, and transmits the control signal S4 indicating the subtask sequence to the robot 5 having the each robot arm 52. Similarly, there may be a plurality of peripheral equipment 8 or conveyor 82. The measurement device 7 may be a part of the robot 5. Further, the robot control unit 51 may be configured separately from the robot 5. In this case, the robot control unit 51 may be incorporated in the control device 1. Further, the input device 2 and the display device 3 may be integrated with the control device 1 as a single device (e.g., a tablet terminal) in such a state that they are incorporated in the control device 1. Further, the control device 1 may be configured by a plurality of devices. In this case, the plurality of devices functioning the control device 1 exchange information necessary to execute the pre-allocated process among the plurality of devices. The robot 5 or the peripheral equipment 8 may be equipped with at least some of the functions of the control device 1.

(2) Hardware Configuration of Control Device

Figure 2:
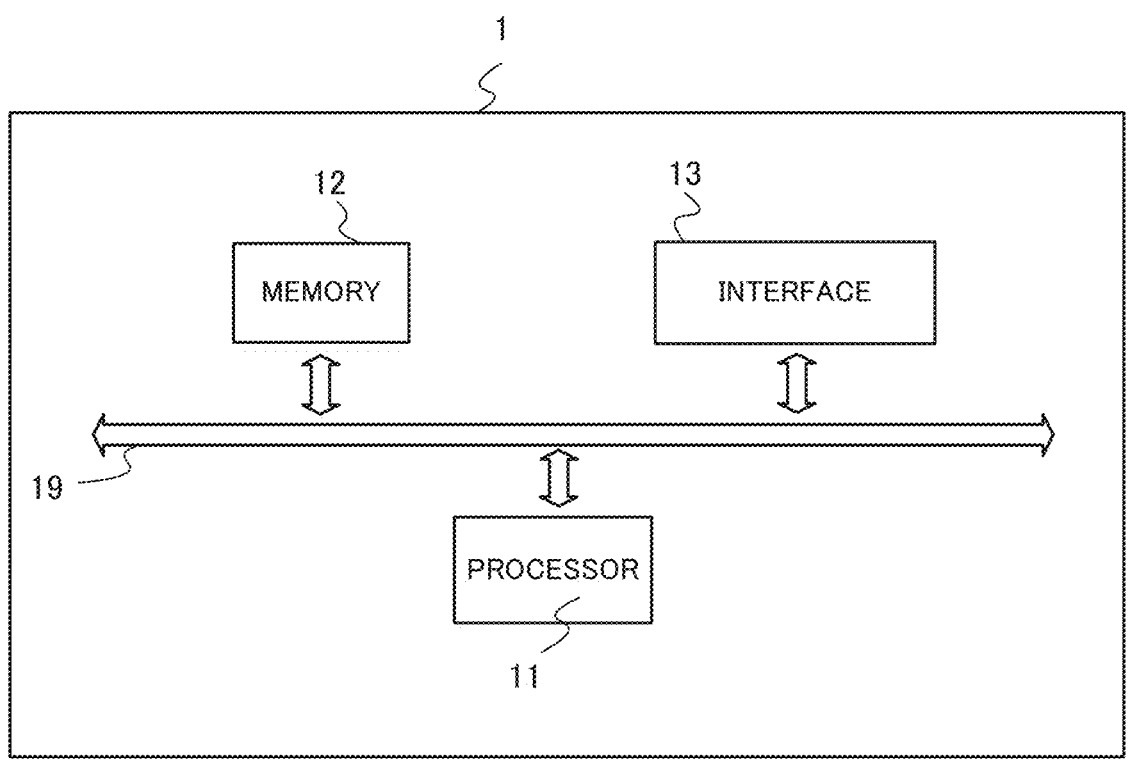
FIG. 2 illustrates a hardware configuration of a control device.

FIG. 2 shows the hardware configuration of the control device 1. The control device 1 includes, as hardware, a processor 11, a memory 12, and an interface 13. The processor 11, the memory 12, and the interface 13 are connected via a data bus 19 to one another.

The processor 11 executes a predetermined process by executing a program stored in the memory 12. The processor 11 is one or more processors such as a CPU (Central Processing Unit) and a GPU (Graphics Processing Unit).

The memory 12 is configured by various memories such as a RAM (Random Access Memory) and a ROM (Read Only Memory). Further, the memory 12 stores a program for the control device 1 to execute a predetermined process. The memory 12 is used as a work memory and temporarily stores information acquired from the storage device 4. The memory 12 may function as the storage device 4. Similarly, the storage device 4 may function as the memory 12 of the control device 1. The program to be executed by the control device 1 may be stored in a storage medium other than the memory 12.

The interface 13 is an interface for electrically connecting the control device 1 to other devices. For example, the interface 13 includes: an interface for connecting the control device 1 to the input device 2; an interface for connecting the control device 1 to the display device 3; and an interface for connecting the control device 1 to the storage device 4. The interface 13 also includes: an interface for connecting the control device 1 to the robot 5; an interface for connecting the control device 1 to the peripheral equipment 8; and an interface for connecting the control device 1 to the measurement device 7. These connections may be wired connections or may be wireless connections. For example, the interface for connecting the control device 1 to the storage device 4 may be a communication interface for wired or wireless transmission and reception of data to and from the storage device 4 under the control of the processor 11. In another example, the control device 1 and the storage device 4 may be connected by a cable or the like. In this case, the interface 13 includes an interface that conforms to a USB (Universal Serial Bus), a SATA (Serial AT Attachment), or the like for exchanging data with the storage device 4.

The hardware configuration of the control device 1 is not limited to the configuration shown in FIG. 2. For example, the control device 1 may include at least one of an input device 2, a display device 3, and a storage device 4. Further, the control device 1 may be connected or built in a sound output device such as a speaker. In these cases, the control device 1 may be a tablet-type terminal or the like in which the input function and the output function are integrated with the main body.

(3) Application Information

Next, a data structure of the application information stored in the application information storage unit 41 will be described.

Figure 3:
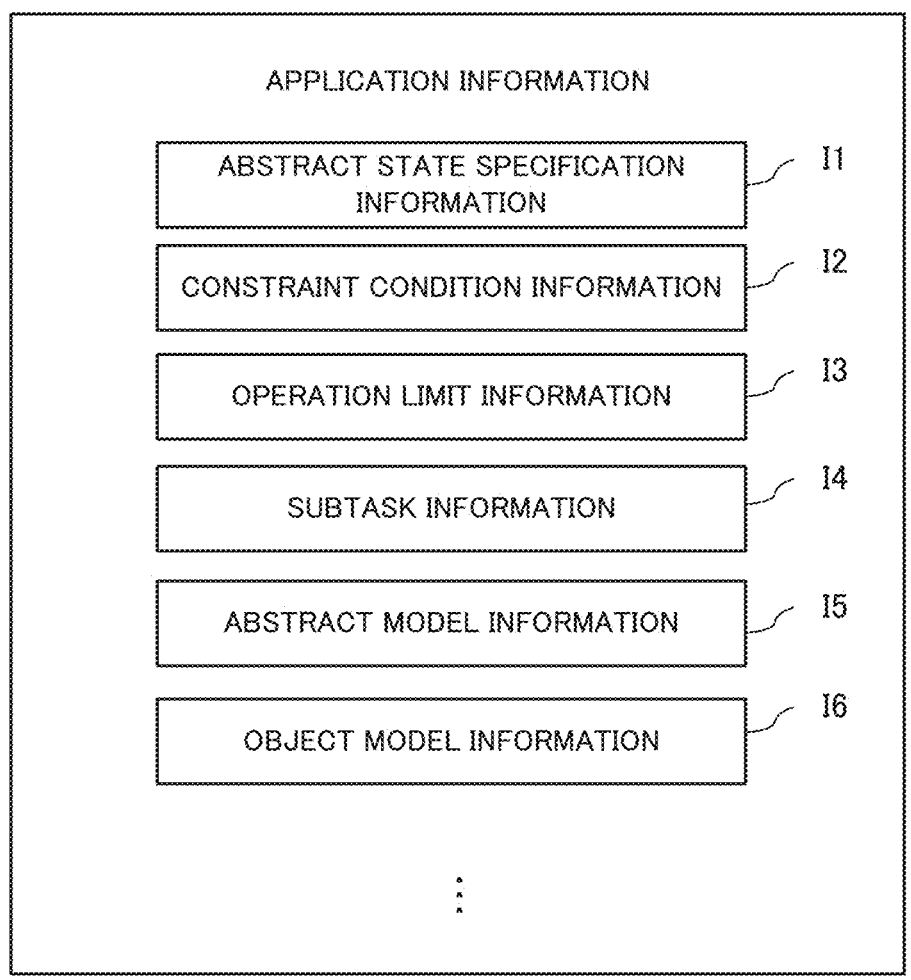
FIG. 3 illustrates an example of the data structure of application information.

FIG. 3 shows an example of a data structure of application information stored in the application information storage unit 41. As shown in FIG. 3, the application information storage unit 41 includes abstract state specification information I1, constraint condition information I2, operation limit information I3, subtask information I4, abstract model information I5, and object model information I6.

The abstract state specification information I1 specifies an abstract state to be defined in order to generate the subtask sequence. The above-mentioned abstract state is an abstract state of an object in the workspace 6, and is defined as a proposition to be used in the target logical formula to be described later. For example, the abstract state specification information I1 specifies the abstract state to be defined for each type of the tasks. The objective task may be various types of tasks such as pick-and-place, assembly of a product, placement of materials into a container such as a lunch box.

The constraint condition information I2 is information indicating the constraint conditions relating to the robot 5 and the peripheral equipment 8 when executing the objective task. For example, the constraint condition information I2 indicates a constraint condition that the robot 5 (robot arm 52) must not be in contact with an obstacle when the objective task is pick-and-place, a constraint condition that the robot 5 and the peripheral equipment 8 must not be in contact with each other, and the like. The constraint condition information I2 may be information in which the constraint conditions suitable for each type of the objective task are recorded.

The operation limit information I3 is information on the operation limits of the robot 5 and the peripheral equipment 8 to be controlled by the control device 1. The operation limit information I3 regarding the robot 5 include information on the operation constraints such as the maximum value of the speed and acceleration of each operation (such as reaching) of the robot arm 52 and the movable angle range thereof. The operation limit information I3 regarding the peripheral equipment 8 includes information on the operation constraints such as the maximum value of the speed and acceleration of the conveyance by the conveyor 82 and the operation constraints such as a possible conveyance direction.

The subtask information I4 includes information on subtasks that the robot 5 can accept and information on subtasks that the peripheral equipment 8 can accept. For example, when the objective task is pick-and-place, the subtask information I4 defines "reaching" that is movement of the robot arm 52 and "grasping" that is grasping by the robot arm 52 as the subtasks of the robot 5, respectively. In this case, the subtask information I4 defines an operation related to the transport of an object by the conveyor 82 as a subtask of the peripheral equipment 8. The subtask information I4 may indicate the information on subtasks that can be used for each type of the objective task when the type of the objective task can be selected by the user.

The abstract model information I5 is information relating to a model (also referred to as "abstract model") in which the dynamics of objects including the robot 5 and the peripheral equipment 8 in the workspace 6 are abstracted. When the type of the objective task can be selected by the user, the abstract model information I5 includes information on an abstract model suitable for each type of the objective task. The abstract model is represented by a model in which real dynamics are abstracted by a hybrid system. The abstract model information I5 includes information indicating one or more conditions (also referred to as "dynamics switching conditions") for switching dynamics in the hybrid system described above. The dynamics switching conditions are conditions for switching the dynamics relating to at least one of the robot 5 or the peripheral equipment 8. In the example of FIG. 1, the following dynamics switching conditions (a) and (b) are given.

(a) "When the target object 61 or the obstacle 62 is mounted on the conveyor 82, it moves in a constant direction according to the moving speed of the conveyor 82".

(b) "When the robot arm 52 grasps the target object 61, the target object 61 moves according to the operation of the robot arm 52 regardless of whether or not it is on the conveyor 82".

The object model information I6 is information relating to an object model of each object (in the example of FIG. 1, the robot arm 52, the target object 61, the obstacle 62, the destination area 63, the conveyor 82, and the like) to be recognized from the output signal S3 generated by the measurement device 7. The object model information I6 includes, for example, information necessary for the control device 1 to recognize the type, position, or/and posture of each object described above, and three-dimensional shape information such as CAD data for recognizing the three-dimensional shape of each object. The former information includes the parameters of an inference engine obtained by learning a learning model used in a machine learning such as a neural network. For example, the above-mentioned inference engine is learned in advance to output, when an image is inputted thereto, the type, the position, the posture, and the like of an object shown in the image.

As described above, the application information includes robot operation (motion) information indicating operation characteristics such as operation limit, subtasks, and the abstract model of the robot 5, and peripheral equipment operation information indicating operation characteristics such as operation limit, subtasks, and the abstract model of the peripheral equipment 8, respectively. In addition to the information described above, the application information storage unit 41 may store various kinds of information related to the generation process of the subtask sequence.

(4) Functional Block

Figure 4:
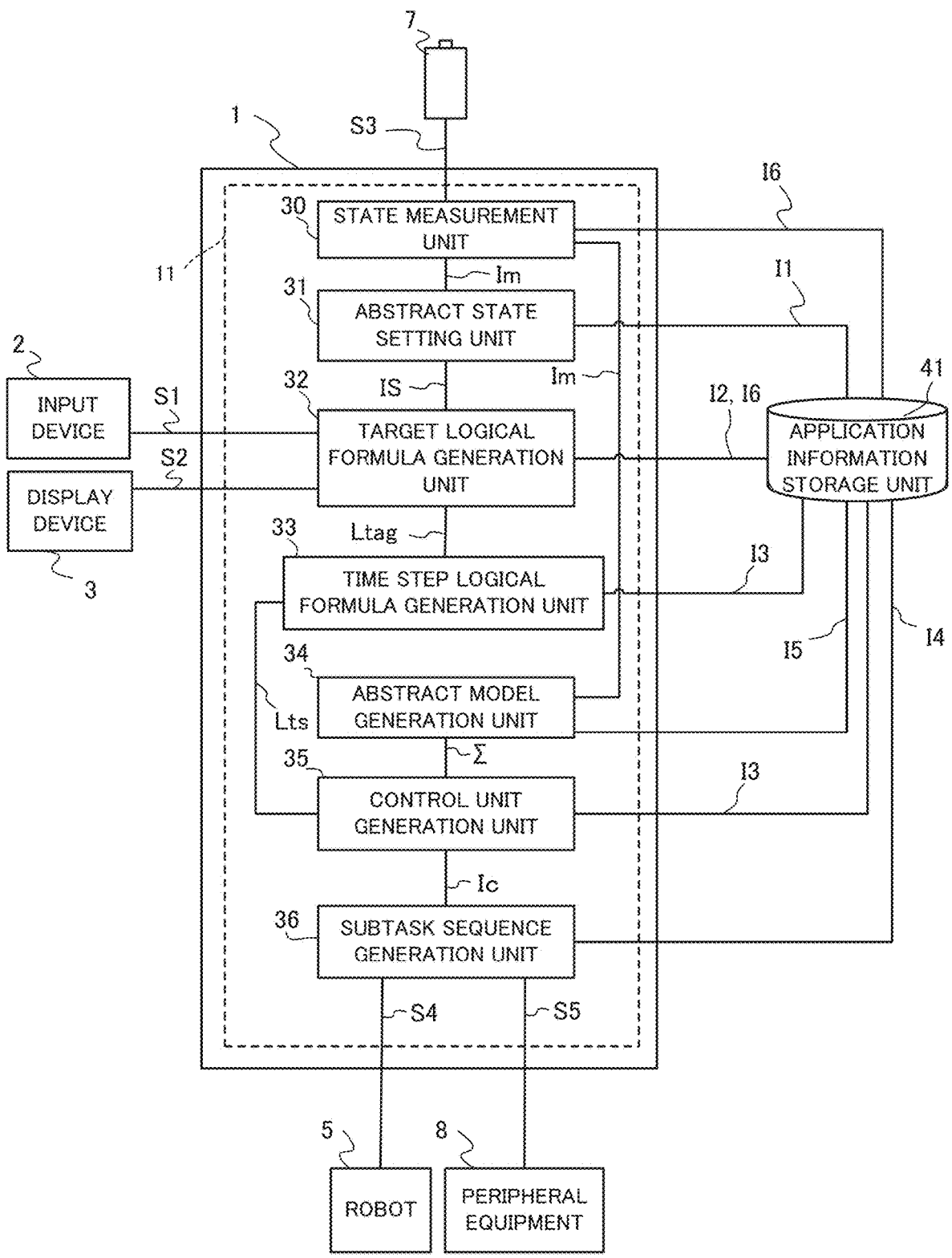
FIG. 4 is an example of a functional block of the control device in the first example embodiment.

FIG. 4 is an example of a functional block of the control device 1. The processor 11 of the control device 1 functionally includes a state measurement unit 30, an abstract state setting unit 31, a target logical formula generation unit 32, a time step logical formula generation unit 33, an abstract model generation unit 34, a control input generation unit 35, and a subtask sequence generation unit 36. In FIG. 4, an example of data to be transmitted and received between the blocks is shown, but it is not limited thereto.

The state measurement unit 30 generates, based on the output signal S3 supplied from the measurement device 7, information (also referred to as "state information Im") indicating the state of objects in the workspace 6. Specifically, when receiving the output signal S3, the state measurement unit 30 refers to the object model information I6 or the like, and analyzes the output signal S3 by a technique (an image processing technique, an image recognition technique, a speech recognition technique, a technique using a RFID (Radio Frequency Identifier)) for recognizing the environment in the workspace 6. Thereby, the state measurement unit 30 measures the number of objects for each type, the position, the posture, and the like of each object in the workspace 6 related to the execution of the objective task, and generates the measurement result as the state information Im. For example, in the case of FIG. 1, the state information Im includes information on the number of the robot arms 52, the target objects 61, the obstacles 62, and the conveyors 82, the positions thereof, and the postures thereof. The state measurement unit 30 supplies the generated state information Im to the abstract state setting unit 31 and the abstract model generation unit 34. In addition to the measurement result of an object having a three-dimensional shape, the state information Im may include measurement results such as a position and an existing range of a planar object (area) related to the objective task such as the destination area 63 shown in FIG. 1.

The abstract state setting unit 31 sets an abstract state in the workspace 6 that needs to be considered when executing the objective task, based on the state information Im described above, the abstract state specification information I1 acquired from the application information storage unit 41, and the like. In this case, the abstract state setting unit 31 defines a proposition for each abstract state to be represented by a logical formula. The abstract state setting unit 31 supplies information (also referred to as "abstract state setting information I5") indicative of the set abstract state to the target logical formula generation unit 32.

When receiving the input signal S1 relating to the objective task from the input device 2, on the basis of the abstract state setting information I5, the target logical formula generation unit 32 converts the objective task indicated by the input signal S1 into a logical formula (also referred to as a "target logical formula Ltag") in the form of the temporal logic representing the final state to be achieved. In this case, by referring to the constraint condition information I2 from the application information storage unit 41, the target logical formula generation unit 32 adds the constraint conditions to be satisfied in executing the objective task to the target logical formula Ltag. Then, the target logical formula generation unit 32 supplies the generated target logical formula Ltag to the time step logical formula generation unit 33. Further, the target logical formula generation unit 32 generates a display signal S2 for displaying a task input view for receiving an input relating to the objective task, and supplies the display signal S2 to the display device 3.

The time step logical formula generation unit 33 converts the target logical formula Ltag supplied from the target logical formula generation unit 32 to the logical formula (also referred to as "time step logical formula Lts") representing the state at each time step. Then, the time step logical formula generation unit 33 supplies the generated time step logical formula Lts to the control input generation unit 35.

On the basis of the state information Im and the abstract model information I5 stored in the application information storage unit 41, the abstract model generation unit 34 generates an abstract model "Σ" in which the real dynamics in the workspace 6 are abstracted. In this case, the abstract model generation unit 34 considers the target dynamics as a hybrid system in which the continuous dynamics and the discrete dynamics are mixed, and generates an abstract model Σ based on the hybrid system. The method for generating the abstract model Σ will be described later. The abstract model generation unit 34 supplies the generated abstract model Σ to the control input generation unit 35.

The control input generation unit 35 determines a control input for the robot 5 and the peripheral equipment 8 for each time step, wherein the control input optimizes the evaluation function while satisfying the time step logical formula Lts supplied from the time step logical formula generation unit 33 and the abstract model Σ supplied from the abstract model generation unit 34. Then, the control input generation unit 35 supplies information (also referred to as "control input information Ic") indicative of the control input to the robot 5 for each time step to the subtask sequence generation unit 36.

The subtask sequence generation unit 36 generates subtask sequences to be executed by the robot 5 and the peripheral equipment 8, respectively, based on the control input information Ic supplied from the control input generation unit 35 and the subtask information I4 stored in the application information storage unit 41. Then, the subtask sequence generation unit 36 supplies a control signal S4 indicating a subtask sequence to be executed by the robot 5 to the robot 5 via the interface 13, and supplies a control signal S5 indicating a subtask sequence to be executed by the peripheral equipment 8 to the peripheral equipment 8 via the interface 13. The control signals S4 and S5 include information indicating the execution order and the execution timing of the each subtask included in the subtask sequences, respectively.

Each component of the state measurement unit 30, the abstract state setting unit 31, the target logical formula generation unit 32, the time step logical formula generation unit 33, the abstract model generation unit 34, the control input generation unit 35, and the subtask sequence generation unit 36 described in FIG. 4 can be realized, for example, by the processor 11 executing the program. More specifically, each component may be implemented by the processor 11 executing a program stored in the memory 12. In addition, the necessary programs may be recorded in any non-volatile recording medium and installed as necessary to realize each component. Each of these components is not limited to being implemented by software using a program, and may be implemented by any combination of hardware, firmware, and software. Each of these components may also be implemented using user programmable integrated circuit, such as, for example, FPGA (field-programmable gate array) or a microcomputer. In this case, the integrated circuit may be used to realize a program to function as each of the above-described components. Thus, each component may be implemented by hardware other than the processor. The above is the same in other example embodiments to be described later.

(5) Detailed Process for Each Block

Next, the details of the processing for each functional block shown in FIG. 4 will be described with reference to specific examples.

(5-1) State Measurement Unit and Abstract State Setting Unit

The state measurement unit 30 generates, based on the output signal S3 supplied from the measurement device 7, the state information Im indicating the state (type, position, etc.) of each object in the workspace 6. The abstract state setting unit 31 sets an abstract state in the workspace 6 based on the state information Im. In this case, the abstract state setting unit 31 refers to the abstract state specification information I1 and recognizes the abstract state to be set in the workspace 6. The abstract state to be set in the workspace 6 varies depending on the type of the objective task. Therefore, when the abstract state to be set is defined for each type of the objective task in the abstract state specification information I1, the abstract state setting unit 31 refers to the abstract state specification information I1 corresponding to the objective task specified by the input signal S1 and recognizes the abstract state to be set.

Figure 5:
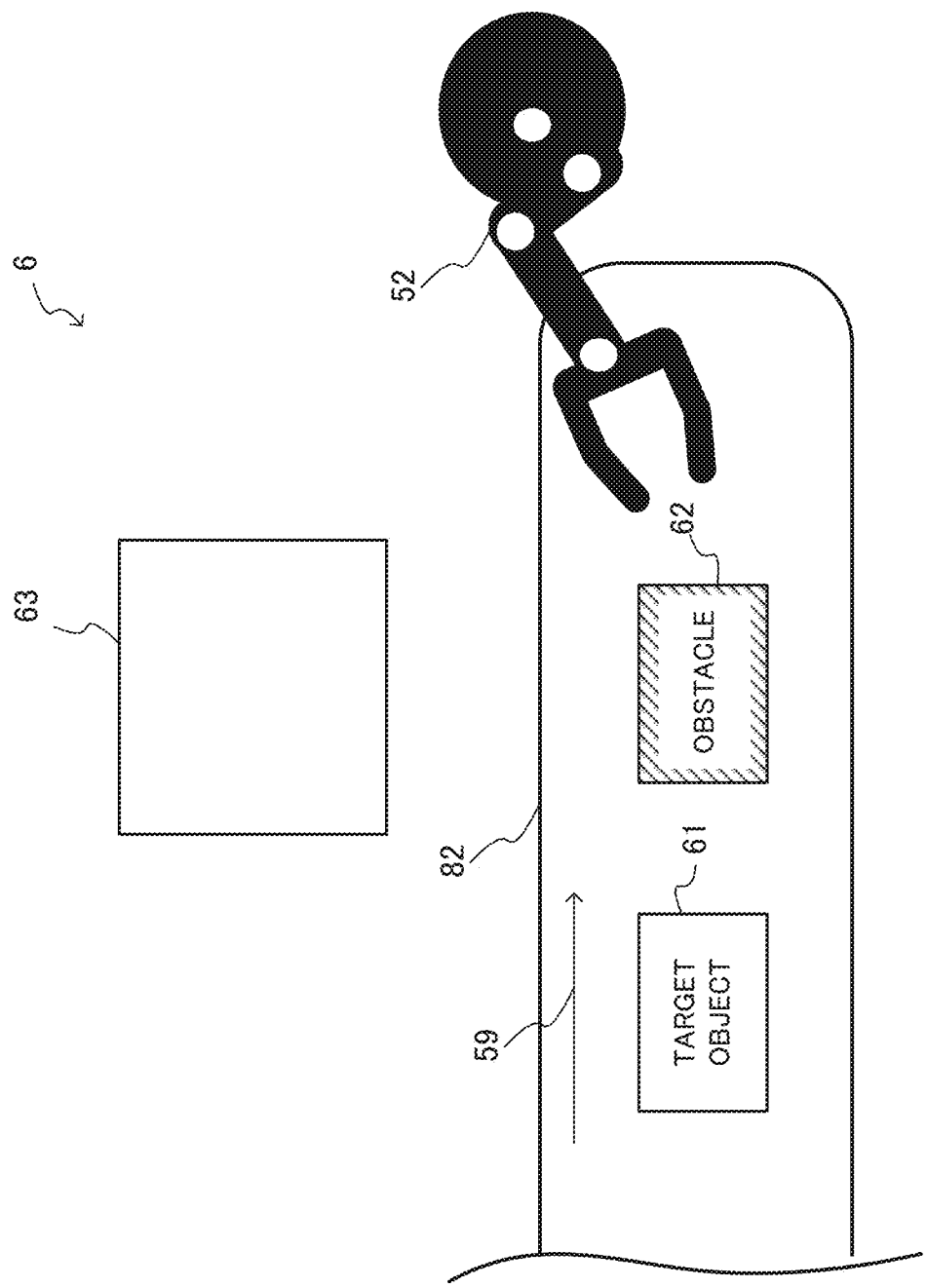
FIG. 5 illustrates a bird's-eye view of the workspace.

FIG. 5 shows a bird's-eye view of the workspace 6. In the workspace 6 shown in FIG. 5, there are a robot arm 52, a conveyor 82 for conveying objects in the direction indicated by the arrow 59, a target object 61 and the obstacle 62 placed on the conveyor 82, and a destination area 63.

In this case, the state measurement unit 30 analyzes the output signal S3 received from the measurement device 7 by using the object model information I6 or the like, and thereby recognizes each state (e.g., position and posture) of the robot arm 52, the conveyor 82, the target object 61, and the obstacle 62, and the position and range of the destination area 63 that is the destination of the target object 61. In this case, for abstraction, the state measurement unit 30 may set the hand (robot hand) of the robot arm 52 as the position of the robot arm 52. Then, the abstract state setting unit 31 determines the abstract state to be defined for the objective task by referring to the abstract state specification information I1. In this case, the abstract state setting unit 31 determines a proposition indicating an abstract state based on the state information Im indicating the recognition result generated by the state measurement unit 30 and the abstract state specification information I1. In the example of FIG. 5, the abstract state setting unit 31 assigns identification labels to the target object 61, the obstacle 62, the robot arm 52, the conveyor 82, and the destination area 63, which are specified by the state information Im, respectively. Further, based on the abstract state specification information I1, the abstract state setting unit 31 defines each proposition to be used in the target logical formula such as a proposition indicating that the target object 61 or the obstacle 62 is mounted on the conveyor 82, a proposition indicating that the target object 61 exists in the destination area 63 that is the destination point where the target object 61 is to be finally placed, and a proposition indicating that the robot arm 52 interferes with the obstacle 62.

Thus, the abstract state setting unit 31 recognizes the abstract state to be defined by referring to the abstract state specification information I1, and defines propositions representing the abstract state according to the number of the target object 61, the number of the robot arms 52, the number of the obstacles 62, and the like. The abstract state setting unit 31 supplies the abstract state setting information I5 indicative of the propositions representing the abstract state to the target logical formula generation unit 32.

(5-2) Target Logical Formula Generation Unit

The target logical formula generation unit 32 accepts an input of the input signal S1 that specifies the type of the objective task and the final state of the target object subject to operation by the robot. Further, the target logical formula generation unit 32 transmits, to the display device 3, the display signal S2 of the task input view for receiving the above-mentioned input.

The target logical formula generation unit 32 converts the objective task specified by the input signal S1 into a logical formula using a temporal logic. The input signal S1 may be represented by use of a natural language. There are various existing technologies for the method of converting tasks expressed in natural language into logical formulas. For example, in the example of FIG. 5, it is herein assumed that the objective task "the target object 62 is finally present in the destination area 63" is given. In this case, the target logical formula generation unit 32 generates the logical formula "$\lozenge g_2$" which represents the objective task by using the operator "$\lozenge$" corresponding to "eventually" of the linear logical formula (LTL: Linear Temporal Logic) and the proposition "$g_i$" defined by the abstract state setting unit 31. The target logical formula generation unit 32 may express the logical formula by using any operators based on the temporal logic other than the operator "$\lozenge$" such as logical AND "$\land$", logical OR "$\lor$", negative "$\neg$", logical implication "$\Rightarrow$", always "$\square$", next "$\circ$", until "U", etc.). The logical formula may be expressed by any temporal logic other than linear temporal logic such as MTL (Metric Temporal Logic) and STL (Signal Temporal Logic).

The target logical formula generation unit 32 acquires the constraint condition information I2 from the application information storage unit 41. When the constraint condition information I2 for each task type is stored in the application information storage unit 41, the target logical formula generation unit 32 acquires the constraint condition information I2 corresponding to the type of the objective task specified by the input signal S1 from the application information storage unit 41.

Then, the target logical formula generation unit 32 generates the target logical formula Ltag obtained by adding the constraint condition indicated by the acquired constraint condition information I2 to the logical formula indicating the objective task. For example, as a constraint condition corresponding to pick-and-place, if "the robot arm 52 always does not interfere with the obstacle 62", "the robot arm 52 always does not interfere with the conveyor 82" are included in the constraint condition information I2, the target logical formula generation unit 32 converts these constraint conditions into logical formulas. Then, the target logical formula generation unit 32 generates the target logical formula Ltag obtained by adding the logical formulas corresponding to these converted constraint conditions to the logical formula corresponding to the objective task.

Next, an input example of the objective task on the task input view will be described.

Figure 6:
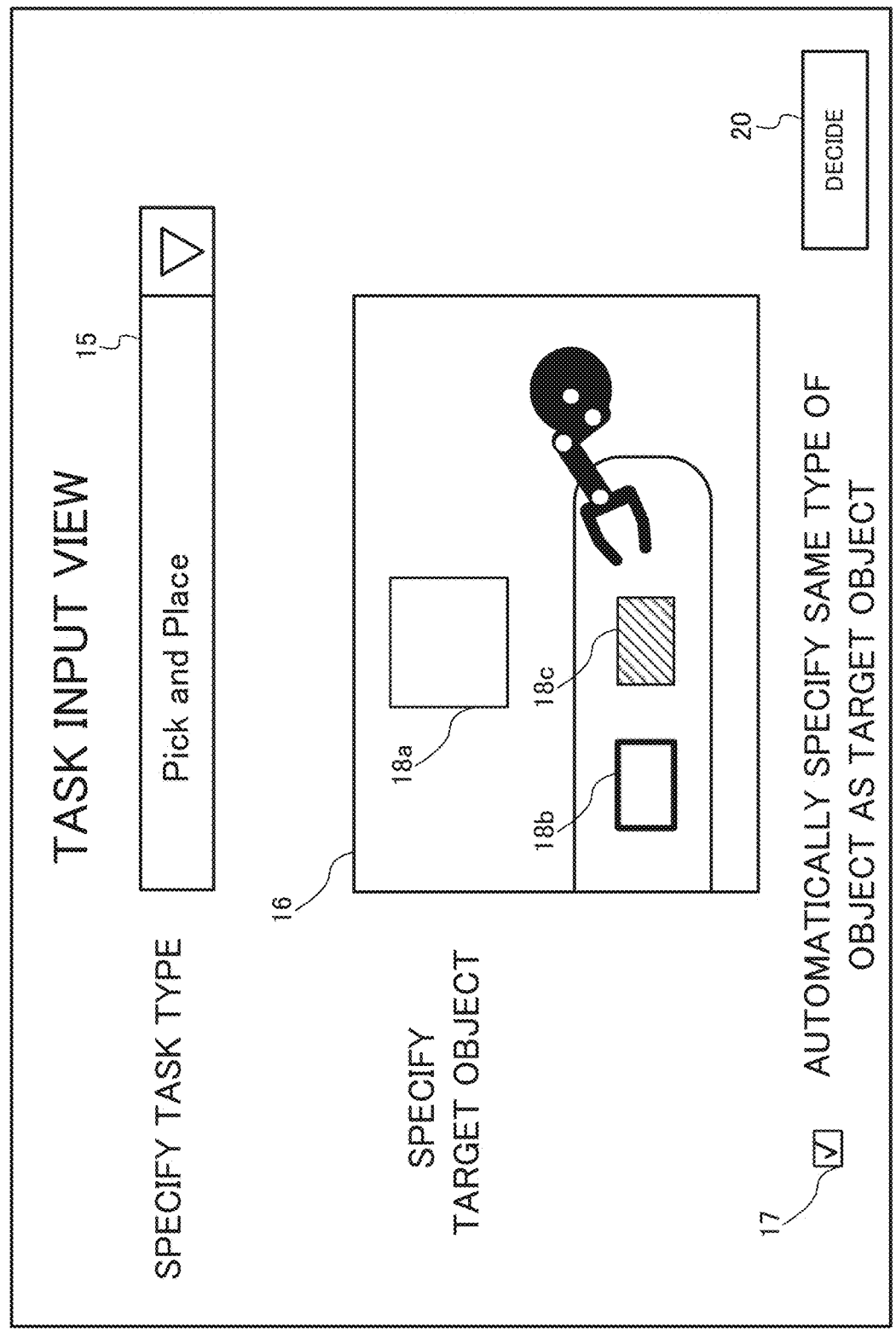
FIG. 6 is a display example of a task input view.

FIG. 6 shows a display example of the task input view. The target logical formula generation unit 32 generates the display signal S2 and transmits the display signal S2 to the display device 3, thereby causing the display device 3 to display the task input view shown in FIG. 6. The task input view shown in FIG. 6 mainly includes a task type designation field 15, an image display field 16, a similar object designation button 17, and a decision button 20, and accepts designation of a task type and designation of an object to be regarded as the target object 61.

The target logical formula generation unit 32 accepts an input for specifying the type of the objective task in the task type specifying field 15. Here, as an example, the task type designation field 15 is an input field in a pull-down menu format. For example, the target logical formula generation unit 32 displays a list of candidates of the types of the objective task in the task type specifying field 15 in a selectable way. In this case, pick-and-place is specified as the type of the objective task in the task type designation field 15.

Further, the target logical formula generation unit 32 displays, in the image display field 16, an image of the workspace 6 taken by the measurement device 7. Then, the target logical formula generation unit 32 accepts an input for specifying an object to be regarded as the target object 61 based on a touch panel operation or a mouse operation on the image display field 16.

In this case, in the first example, at the time of display of the task input view, the target logical formula generation unit 32 recognizes the areas (here, the areas 18b and 18c) of objects to be candidates of the target object 61 in the image display field 16 based on the known image recognition process. Then, when one of the areas is selected by touch operation or click operation, the target logical formula generation unit 32 determines the target object 61 to be the object of the selected area (here, the area 18b). In the second example, when a pixel that is a part of the target object 61 are specified by touch operation or click operation, the target logical formula generation unit 32 determines the area of the target object 61 to be the area, including the specified pixel, of the object. In the third example, when detecting an operation of circling the image area of an object to be the target object 61, the target logical formula generation unit 32 determines the target object 61 to be the object circled in the image area.

Further, the target logical formula generation unit 32 automatically recognizes, through the image recognition process, that the area 18a is an area indicating the destination area 63. In this case, the destination area 63 may be provided with a marker or the like for facilitating the target logical formula generation unit 32 to recognize the destination area 63. In another example, information such as the shape and size of the destination area 63 may be stored in the storage device 4 as the application information. Instead of automatically recognizing the destination area 63, in the same way as recognizing the target object 61, the target logical formula generation unit 32 may recognize the destination area 63 by receiving an input specifying the destination area 63. Further, in this case, the target logical formula generation unit 32 may recognize the destination area 63 by receiving the input of the final destination of the target object 61 by drag-and-drop operation.

Further, in a state that the same type object designation button 17 is selected, the target logical formula generation unit 32 determines the target object 61 to be not only the object specified on the image display field 16 but also other object(s) whose type is the same as the specified object. In this case, the object regarded as the target object 61 may be an object that is outside the measurement range by the measurement device 7 at the time of display of the task input view. Thus, the target logical formula generation unit 32 can efficiently specify the target object 61 to the user. If the type of objects to be regarded as the target object 61 is predetermined, the control device 1 may recognize the target object 61 without accepting an input for specifying the target object 61. In this case, the object model information I6 or the like includes information for identifying the target object 61, and the state measurement unit 30 performs the identification and state (position, posture, or the like) recognition of the target object 61 by referring to the object model information I6 or the like.

When detecting that the decision button 20 has been selected, the target logical formula generation unit 32 generates the target logical formula Ltag using the information on the objective task, the target object 61, and/or the destination area 63 recognized based on the input signal S1 indicating the contents of the input on the task input view. The target logical formula generation unit 32 may supply the abstract state setting unit 31 with the information on the objective task, the target object 61 or/and the destination area 63 recognized based on the input signal S1. In this case, the abstract state setting unit 31 sets propositions relating to the objective task, the target object 61, or the destination area 63 based on the supplied information.

(5-3) Time Step Logical Formula Generation Unit

The time step logical formula generation unit 33 determines the number of time steps (also referred to as the "target time step number") for completing the objective task, and determines combinations of propositions representing the state at each time step such that the target logical formula Ltag is satisfied with the target time step number. Since the combinations are normally plural, the time step logical formula generation unit 33 generates a logical formula obtained by combining these combinations by logical OR as the time step logical formula Lts. Each of the combinations described above is a candidate of a logical formula representing a sequence of operations to be instructed to the robot 5, and therefore it is hereinafter also referred to as "candidate $\varphi$". Therefore, the time step logical formula generation unit 33 determines the time step logical formula Lts to be logical OR of generated candidates $\varphi$. In this case, the time step logical formula Lts is true when at least one of the generated candidates $\varphi$ is true.

In some embodiments, t by referring to the operation limit information I3, the time step logical formula generation unit 33 determines the feasibility of each generated candidate $\varphi$ and excludes the candidate $\varphi$ that is determined to be unfeasible. For example, the time step logical formula generation unit 33 recognizes, based on the operation limit information I3, the movable distance of the tip (robot hand) of the robot arm 52 per one time step and the movable distance of the target object 61 by the conveyor 82 per one time step. Further, the time step logical formula generation unit 33 recognizes the distance between the target object 61 to be moved and the robot hand based on the position vectors of the target object 61 and the robot hand indicated by the state information Im. Then, the time step logical formula generation unit 33 determines the feasibility based on these distances.

Thus, by excluding the unfeasible candidates with reference to the operation limit information I3 from the time step logical formula Lts, the time step logical formula generation unit 33 can suitably reduce the load of the process to be executed by the following process units.

Next, a supplementary description will be given of a method for setting the target time step number.

For example, the time step logical formula generation unit 33 determines the target time step number based on the prospective (expected) work time specified by user input. In this case, the time step logical formula generation unit 33 calculates the target time step number based on the prospective work time described above and the information on the time width per time step stored in the memory 12 or the storage device 4. In another example, the time step logical formula generation unit 33 stores, in advance in the memory 12 or the storage device 4, information in which a suitable target time step number is associated with each type of objective task, and determines the target time step number in accordance with the type of objective task to be executed by referring to the information.

In some embodiments, the time step logical formula generation unit 33 sets the target time step number to a predetermined initial value. Then, the time step logical formula generation unit 33 gradually increases the target time step number until the time step logical formula Lts with which the control input generation unit 35 can determine the control input is generated. In this case, if the control input generation unit 35 ends up not being able to derive the optimal solution in the optimization process with the set target time step number, the time step logical formula generation unit 33 add a predetermined number (1 or more integers) to the target time step number.

At this time, the time step logical formula generation unit 33 may set the initial value of the target time step number to a value smaller than the number of time steps corresponding to the work time of the objective task expected by the user. Thus, the time step logical formula generation unit 33 suitably suppresses setting the unnecessarily large target time step number.

(5-4) Abstract Model Generation Unit

The abstract model generation unit 34 generates the abstract model $\Sigma$ based on the state information Im and the abstract model information I5. Here, information necessary for generating the abstract model $\Sigma$ is recorded in the abstract model information I5. For example, when the objective task is pick-and-place, an abstract model in a general format is recorded in the abstract model information I5, wherein the abstract model in the general format does not specify the position and number of the target objects, the position of the destination area where the target objects are placed, the number of the robot arm 52, the position and the conveyance speed (and the conveyance direction) of the conveyor 82, and the like. This abstract model may be represented by a difference equation showing the relationship between the state of objects in the workspace 6 at time step "k" and the state of the objects in the workspace 6 at time step "k+1". At this time, for example, the difference equation is provided with position vectors indicating the positions of the objects and a position vector indicating the position of the hand of the robot arm 52 as variables.

Then, the abstract model generation unit 34 generates the abstract model $\Sigma$ obtained by reflecting, in the abstract model in the general format recorded in the abstract model information I5, the position and the number of the target objects, the position of the area where the target objects are placed, the number of robots 5, and the like indicated by the state information Im.

Here, at the time of work of the objective task by the robot 5, the dynamics in the workspace 6 are frequently switched. Therefore, the abstract model recorded in the abstract model information I5 is a model in which the switching of the dynamics is abstractly expressed by use of logical variables. Therefore, by abstractly expressing, in the abstract model using the logic variables, the event (operation) which causes the dynamics to switch, the abstract model generation unit 34 can suitably represent the switching of the dynamics by the abstract model.

For example, in the workspace 6 shown in FIGS. 1 and 5, there are following conditions to switch the dynamics.

(a) "When any of the target objects 61 or the obstacle 62 is mounted on the conveyor 82, it moves in a constant direction at the operating speed of the conveyor 82."

(b) "When the robot arm 52 grasps a target object 61, the target object 61 moves based on the motion of the robot arm 52 regardless of whether or not it is on the conveyor 82."

Therefore, in this case, the abstract model generation unit 34 abstractly expresses, in the abstract model using the logic variables, such a behavior that any of the target objects 61 or the obstacle 62 is mounted on the conveyor 82 while abstractly expressing, in the abstract model using the logic variables, such a behavior that the robot arm 52 grasps a target object 61.

Thus, the abstract model generation unit 34 refers to the abstract model information I5 and sets an abstract model $\Sigma$ that is a model in which the dynamics in the workspace 6 is abstracted by a hybrid system, wherein, in the hybrid system, the switching of the dynamics is represented by a logic variable that is a discrete value and the movement of objects is represented by continuous values. Here, when the abstract model $\Sigma$ is represented by a difference equation representing the relation between the state of objects in the workspace 6 at the time step "k" and the state thereof at the time step "k+1", the difference equation includes position vectors representing the state of the objects, variables (parameters) representing a control input to the robot 5 and a control input to the peripheral equipment 8, and logic variable(s) representing the switching of the dynamics.

The abstract model $\Sigma$ also represents abstracted dynamics rather than detailed whole dynamics of the robot 5 and peripheral equipment 8. For example, in the abstract model $\Sigma$ regarding the robot 5, only the dynamics of the robot hand that is the hand of the robot 5 to actually grip the object may be represented. In another example, in the abstract model $\Sigma$, the dynamics of the peripheral equipment 8 may be represented by such dynamics that the position of an object placed on the conveyor 82 changes in accordance with the control input to the peripheral equipment 8. Accordingly, it is possible to suitably reduce the calculation amount of the optimization process by the control input generation unit 35.

It is noted that the abstract model generation unit 34 may generate any hybrid system model such as mixed logical dynamical (MLD) system, Petri nets, automaton, and their combination.

(5-5) Control Input Generation Unit

The control input generation unit 35 determines each optimal control input, for each time step, to the robot 5 and the peripheral equipment 8 based on the time step logical formula Lts supplied from the time step logical formula generation unit 33 and the abstract model $\Sigma$ supplied from the abstract model generation unit 34. In this case, the control input generation unit 35 defines an evaluation function for the objective task and solves the optimization problem of minimizing the evaluation function using the abstract model Σ and the time step logical formula Lts as constraint conditions.

For example, the evaluation function is predetermined for each type of the objective task and stored in the memory 12 or the storage device 4. The evaluation function may be designed to minimize the energy spent by the robot 5 or may be designed to minimize the energy spent by the robot 5 and peripheral equipment 8. In the example shown in FIGS. 1 and 5, for example, the control input generation unit 35 determines the evaluation function such that the distance "$d_k$" between the target object 61 and the destination area 63, the control input "$u_{kr}$" to the robot 5, and the control input "$u_{kp}$" to the conveyor 82 is minimized. Specifically, for example, the control input generation unit 35 determines the evaluation function that is the sum, in all time steps, of the squared norm of the distance $d_k$, the squared norm of the control input $u_{kr}$, and the squared norm of the control input $u_{kp}$. In this case, the control input generation unit 35 may multiply each of the term of the distance $d_k$, the term of the control input $u_{kr}$, and the term of the control input $u_{kp}$ by individually predetermined weight coefficient. The control input $u_{kr}$ and the control input $u_{kp}$ may be represented by velocity or acceleration.

Then, using the set evaluation function, the control input generation unit 35 solves the constrained mixed integer optimization problem whose constraint conditions are the abstract model Σ and the time step logical formula Lts (i.e., the logical OR of the candidates $\varphi_i$). Here, to reduce the calculation amount, the control input generation unit 35 may set a continuous relaxation problem by approximating the logic variable by a continuous value. When STL is adopted instead of linear temporal logic (LTL), it can be described as a nonlinear optimization problem. Accordingly, the control input generation unit 35 calculates the control input $u_{kr}$ for the robot 5 and the control input $u_{kp}$ for the conveyor 82, respectively.

Further, if the target time step number is long (e.g., larger than a predetermined threshold value), the control input generation unit 35 may set the number of time steps to be used for optimization to a value (e.g., the threshold value described above) smaller than the target time step number. In this case, for example, every time a predetermined number of time steps elapses, the control input generation unit 35 sequentially determines the control input $u_{kr}$ and the control input $u_{kp}$ by solving the above-described optimization problem.

In some embodiments, every time a predetermined event corresponding to the intermediate state for the accomplishment state of the objective task has occurred, the control input generation unit 35 may solve the above-described optimization problem to determine the control input $u_{kr}$ and the control input $u_{kp}$ to be used. In this case, the control input generation unit 35 sets the number of time steps (time step number) to be used for optimization to the number of time steps until the next event occurrence. Examples of the above described event include an event in which the dynamics switches in the workspace 6. For example, when pick-and-place is the objective task, examples of the above described event include an event that the robot 5 grasps a target object and an event that the robot 5 finishes carrying one of target objects to be carried to the destination point. For example, the above described event is predetermined for each type of the objective task, and information specifying the above described event for each type of the objective task is stored in the storage device 4.

Accordingly, it is possible to suitably reduce the calculation amount of the optimization problem by reducing the number of time steps to be used for optimization.

(5-6) Subtask Sequence Generation Unit

The subtask sequence generation unit 36 generates a subtask sequence based on the control input information Ic supplied from the control input generation unit 35 and the subtask information I4 stored in the application information storage unit 41. In this case, by referring to the subtask information I4, the subtask sequence generation unit 36 recognizes subtasks that the robot 5 can accept and subtasks that the peripheral equipment 8 can accept, respectively. Then, the subtask sequence generation unit 36 converts the control input to the robot 5 for each time step indicated by the control input information Ic into subtasks for the robot 5 while converting the control input to the peripheral equipment 8 for each time step indicated by the control input information Ic into subtasks for the peripheral equipment 8.

For example, in the subtask information I4, there are defined functions representing two subtasks, the movement (reaching) of the robot hand and the grasping by the robot hand, as subtasks that can be accepted by the robot 5 when the objective task is pick-and-place. In this case, for example, the function "Move" representing the reaching is a function that uses the following three arguments (parameters): the initial state of the robot 5 before the function is executed; the final state of the robot 5 after the function is executed; and the time to be required for executing the function. In addition, for example, the function "Grasp" representing the grasping is a function that uses the following these arguments: the state of the robot 5 before the function is executed; the state of the target object to be grasped before the function is executed; and the logical variable indicative of the switching of the dynamics. Here, the function "Grasp" indicates performing a grasping operation when the logical variable is "1", and indicates performing a releasing operation when the logic variable is "0". In this case, the subtask sequence generation unit 36 determines the function "Move" based on the trajectory of the robot hand determined by the control input for each time step indicated by the control input information Ic, and determines the function "Grasp" based on the transition of the logical variable for each time step indicated by the control input information Ic.

Then, the subtask sequence generation unit 36 generates a subtask sequence configured by the function "Move" and the function "Grasp", and supplies the control signal S4 indicative of the subtask sequence to the robot 5. For example, if the objective task is "the target object 61 is finally present in the destination area 63", the subtask sequence generation unit 36 generates the subtask sequence of the function "Move", the function "Grasp", the function "Move", and the function "Grasp" for the robot arm 52. In this case, the robot arm 52 moves to the position of the target object 61 on the conveyor by the function "Move", grasps the target object 61 by the function "Grasp", moves to the destination area 63 by the function "Move", and places the target object 61 in the destination area 63 by the function "Grasp".

In the same way, the subtask sequence generation unit 36 generates a subtask sequence to be executed by the peripheral equipment 8 on the basis of subtasks that can be executed by the peripheral equipment 8 indicated by the subtask information I4 and a time-series control input to the peripheral equipment 8 indicated by the control input information Ic. In this case, the subtasks of the peripheral equipment 8 at least include a function (also referred to as "moving function") for moving an object on the conveyor 82. The moving function has at least one parameter indicative of the moving speed or the acceleration, and the subtask sequence generation unit 36 generates a subtask sequence including the moving function in which the above-described parameter is specified based on the time series control input to the peripheral equipment 8 indicated by the control input information Ic. As subtasks of the peripheral equipment 8, not only the moving function but also various functions such as a function instructing the change in the moving direction and a function instructing pause may be registered in the subtask information I4.

(6) Process Flow

Figure 7:
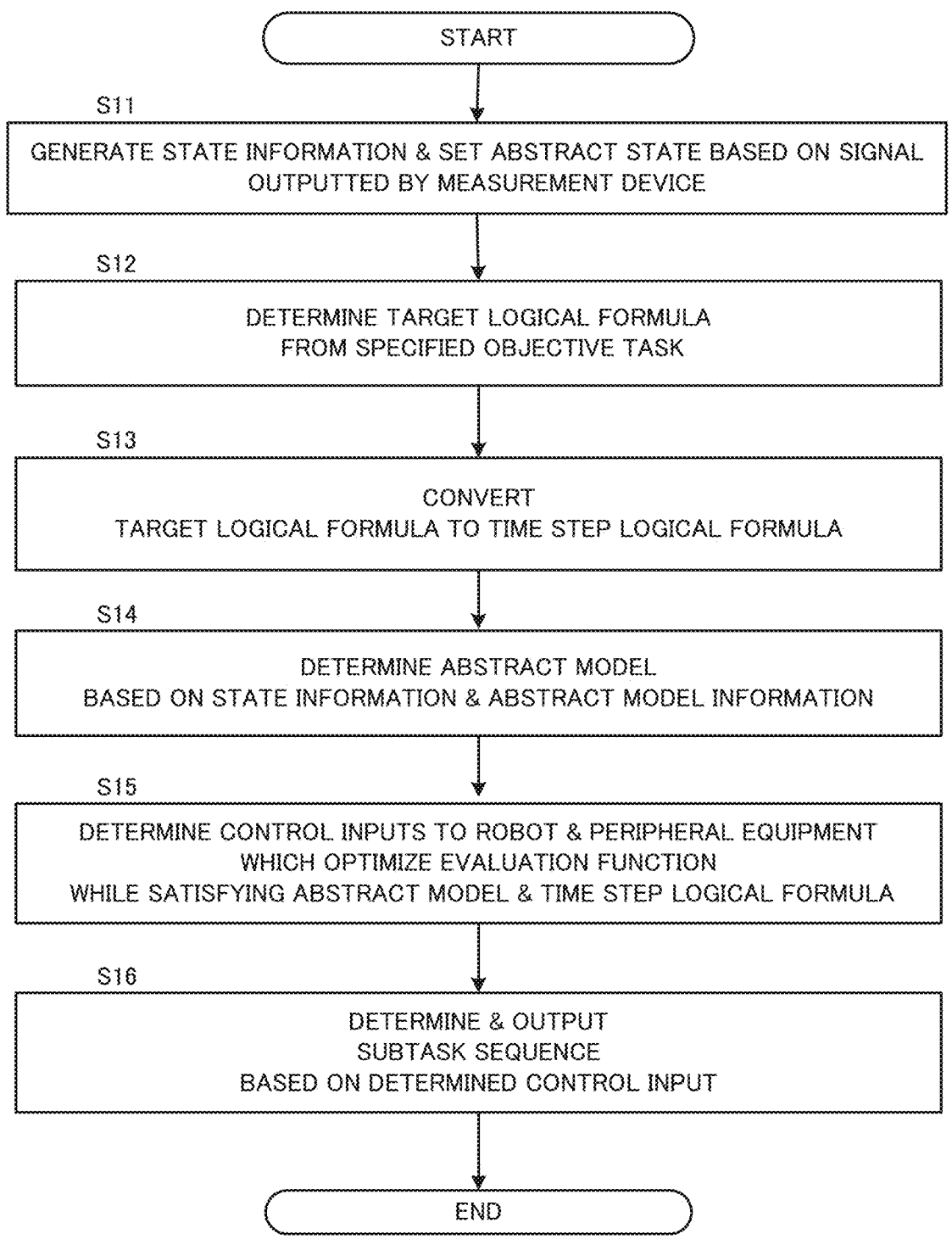
FIG. 7 is an example of a flowchart showing a control process related to the robot and the peripheral equipment in the first example embodiment.

FIG. 7 is an example of a flowchart showing a control process executed by the control device 1 in the first example embodiment.

First, the state measurement unit 30 of the control device 1 generates, based on the output signal S3 supplied from the measurement device 7, the state information Im indicating the measurement result of the objects in the workspace 6. Then, abstract state setting unit 31 sets, based on the state information Im, abstract state in the workspace 6 (step S11). Next, the target logical formula generation unit 32 determines the target logical formula Ltag from the objective task specified by the input signal S1 or the like (step S12). In this case, by referring to the constraint condition information I2, the target logical formula generation unit 32 adds the constraint conditions in executing the objective task to the target logical formula Ltag. It is noted that the process at step S12 may be executed before step S11.

Then, the time step logical formula generation unit 33 converts the target logical formula Ltag to the time step logical formula Lts representing the state at each time step (step S13). In this case, the time step logical formula generation unit 33 determines the target time step number, and generates the time step logical formula Lts that is the logical OR of the candidates φ representing the state at each time step such that the target logical formula Ltag is satisfied at the target time step number. In this case, in some embodiments, the time step logical formula generation unit 33 determines, by referring to the operation limit information I3, the feasibility of each candidate φ, and excludes the candidate(s) φ determined to be unfeasible from the time step logical formula Lts.

Next, the abstract model generation unit 34 determines the abstract model Σ suitable for the objective task based on the state information Im generated at step S11 and the abstract model information I5 (step S14). This abstract model Σ is a hybrid system in which the switching of the dynamics based on whether or not to satisfy the dynamics switching condition on the robot 5 or peripheral equipment 8 is expressed by a discrete value. Then, the control input generation unit 35 determines the control input to the robot 5 and the control input to the peripheral equipment 8 which optimize the evaluation function while satisfying the abstract model Σ and the time step logical formula Lts (step S15). Then, the subtask sequence generation unit 36 determines, based on the control inputs determined by the control input generation unit 35, the subtask sequences to be executed by the robot 5 and the peripheral equipment 8 and outputs the subtask sequences to the robot 5 and to the peripheral equipment 8, respectively (step S16). In this case, the subtask sequence generation unit 36 transmits the control signal S4 indicating the subtask sequence to be executed by the robot 5 to the robot 5 via the interface 13, and transmits the control signal S5 indicating the subtask sequence to be executed by the peripheral equipment 8 to the peripheral equipment 8 via the interface 13.

(7) Modification

The configuration of the functional block of the processor 11 shown in FIG. 4 is an example, and various changes may be applied thereto. For example, instead of the processor 11 having the state measurement unit 30, the measurement device 7 may have a function corresponding to the state measurement unit 30 to generate the state information Im and supply the state information Im to the control device 1. In another example, information on candidates φ of the operation sequence to be instructed to the robot 5 and to the peripheral equipment 8 is stored in advance in the storage device 4, and the control device 1 executes an optimization process by the control input generation unit 35 based on the information. Thus, the control device 1 selects the optimal candidate φ and determines the control input to the robot 5 and the control input to the peripheral equipment 8. In this case, the control device 1 may not have functions corresponding to the abstract state setting unit 31, the target logical formula generation unit 32 and the time step logical formula generation unit 33. Further, information on the execution result of some of the function blocks of the processor 11 shown in FIG. 4 may be stored in advance in the application information storage unit 41.

Second Example Embodiment

Figure 8:
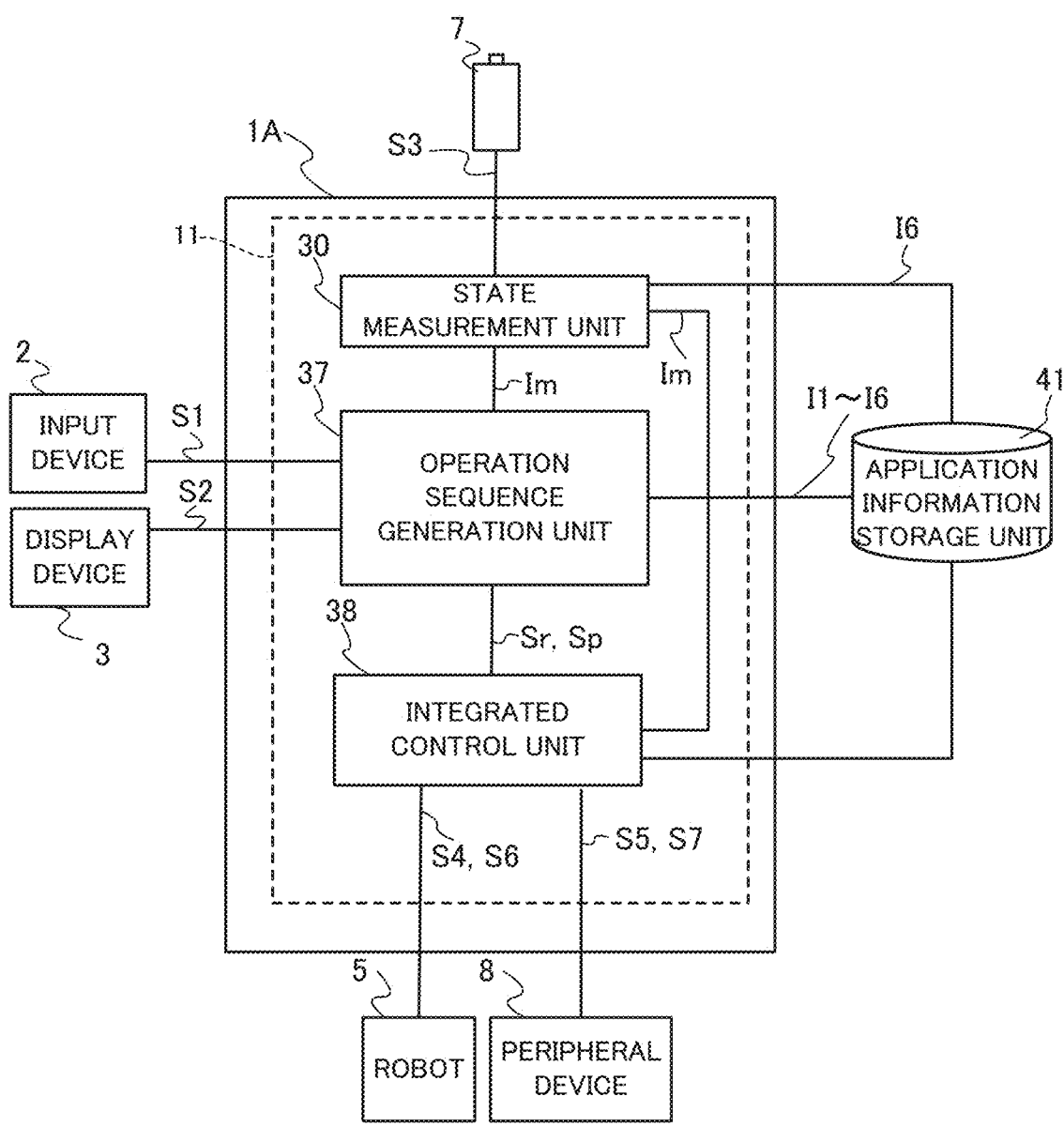
FIG. 8 is an example of a schematic configuration diagram of the control device in the second example embodiment.

FIG. 8 is a schematic configuration diagram of a control device 1A in the second example embodiment. The second example embodiment differs from the first example embodiment in that the control device 1A monitors the state of the robot 5 and the peripheral equipment 8 which are operating according to the subtask sequences and makes an adjustment for the robot 5 and the peripheral equipment 8 to execute the given subtask sequences, respectively. Hereinafter, the same components as in the first example embodiment are denoted by the same reference numerals as in the first example embodiment, and description thereof will be omitted.

The control device 1A has a hardware configuration shown in FIG. 2 described in the first example embodiment. Then, as shown in FIG. 8, the processor 11 of the control device 1A functionally includes a state measurement unit 30, an operation sequence generation unit 37, and an integrated control unit 38.

The state measurement unit 30 generates, on the basis of the output signal S3 and the object model information I6, the state information Im by performing the same process as the process executed by the state measurement unit 30 according to the first example embodiment, and supplies the state information Im to the operation sequence generation unit 37 and the integrated control unit 38, respectively. It is noted that the process executed by the state measurement unit 30 may be executed by the measurement device 7 instead.

On the basis of various information stored in the application information storage unit 41 and the state information Im, the operation sequence generation unit 37 generates a subtask sequence (also referred to as "robot operation sequence Sr") to be executed by the robot 5 and a subtask sequence (also referred to as "peripheral equipment operation sequence Sp") to be executed by the peripheral equipment 8, respectively. Here, the operation sequence generation unit 37 has a function corresponding to the abstract state setting unit 31, the target logical formula generation unit 32, the time step logical formula generation unit 33, the abstract model generation unit 34, the control input generation unit 35, and the subtask sequence generation unit 36 shown in FIG. 4 in the first example embodiment.

The integrated control unit 38 controls the robot 5 and the peripheral equipment 8 based on the robot operation sequence Sr, the peripheral equipment operation sequence Sp, the state information Im, the state signal "S6" transmitted from the robot 5, and the state signal "S7" transmitted from the peripheral equipment 8. Here, the state signal S6 is a signal outputted by a sensor configured to detect the state of the robot 5 or a signal indicative of the state of the robot 5 generated by the robot control unit 51. The state signal S7 is a signal outputted by a sensor configured to detect the state of the peripheral equipment 8 or a signal indicative of the state of the peripheral equipment 8 generated by the peripheral equipment control unit 81. These state signals are information that directly or indirectly indicates the degree of progress of the subtasks to be executed by the robot 5 and the subtasks to be executed by the peripheral equipment 8, respectively.

The integrated control unit 38 compares the state (also referred to as "measurement state") of the robot 5 and peripheral equipment 8 measured during the execution of the operation sequences by the robots 5 and peripheral equipment 8 with the state (also referred to as "predicted state") of the robot 5 and peripheral equipment 8 predicted based on the assumption that they operate in accordance with the operation sequence. The integrated control unit 38 estimates the measurement state based on at least one of the state signal S6 and the state signal S7, or the state information Im. If the measurement state does not match the predicted state, the integrated control unit 38 performs control of at least one of the robot 5 and the peripheral equipment 8 so as to bring the above-described measurement state and the predicted state close to each other.

Figure 9:
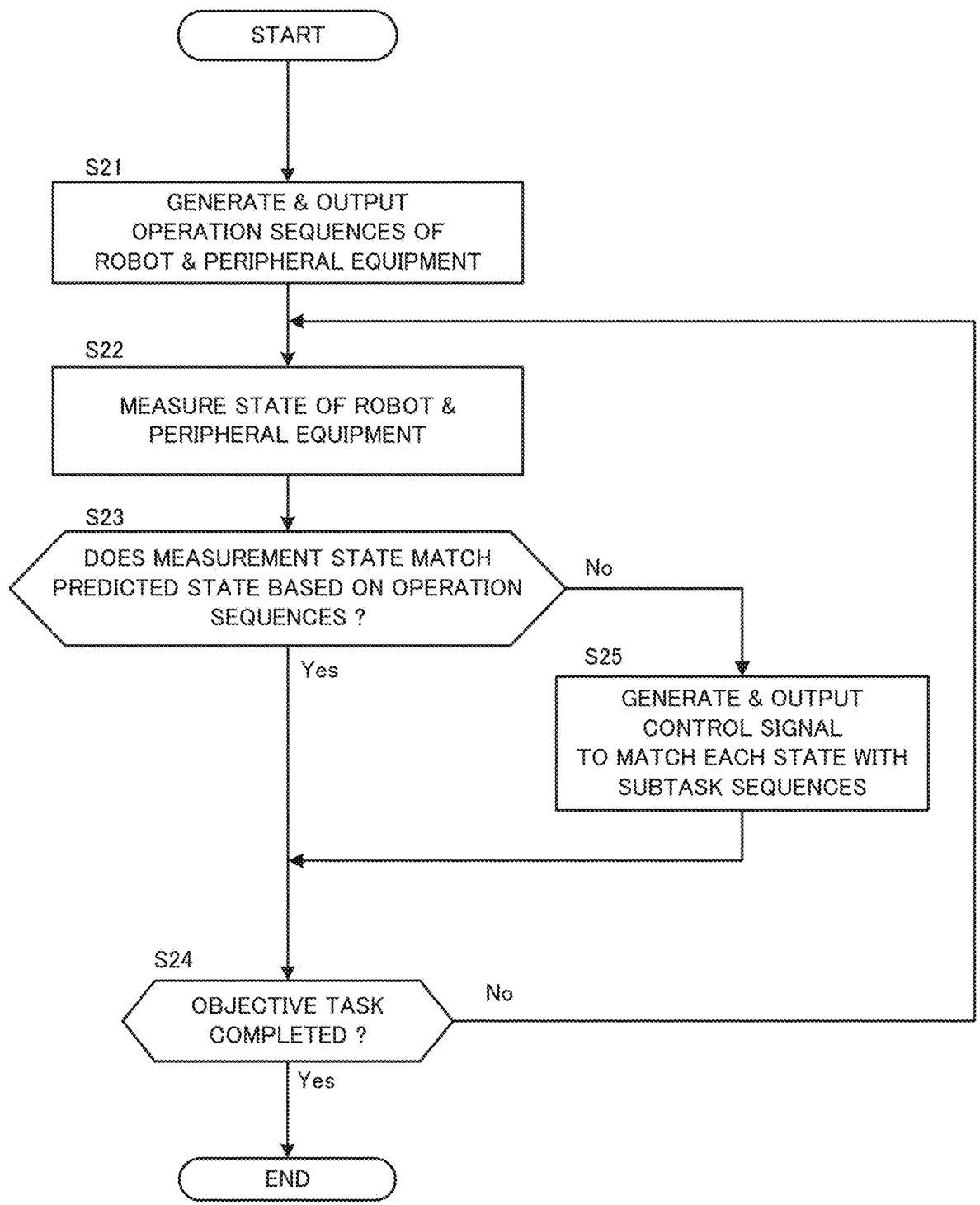
FIG. 9 is an example of a flowchart showing a control process related to the robot and the peripheral equipment in the second example embodiment.

FIG. 9 is an example of a flowchart illustrating a control process of the robot 5 and the peripheral equipment 8 executed by the control device 1A in the second example embodiment. In the flowchart shown in FIG. 9, it is assumed that the state measurement unit 30 constantly generates the state information Im based on the output signal S3 supplied from the measurement device 7.

First, the operation sequence generation unit 37 generates the robot operation sequence Sr and the peripheral equipment operation sequence Sp, respectively, based on the state information Im and the application information. The integrated control unit 38 transmits the control signal S4 indicating the robot operation sequence Sr to the robot 5 and transmits the control signal S5 indicating the peripheral equipment operation sequence Sp to the peripheral equipment 8 (step S21).

Thereafter, the integrated control unit 38 measures each state of the robot 5 and the peripheral equipment 8 (step S22). In this case, the integrated control unit 38 recognizes the measurement state of the robot 5 by at least one of the state signal S6 or the state information Im, and recognizes the measurement state of the peripheral equipment 8 by at least one of the state signal S7 or the state information Im.

Next, the integrated control unit 38 determines whether or not the measurement state of the robot 5 and the peripheral equipment 8 matches the predicted state thereof predicted based on the operation sequences (step S23). In this case, in the first example, the integrated control unit 38 calculates measured position and predicted position of the robot 5 and the peripheral equipment 8 as the measurement state and the prediction state described above. Then, if the difference (i.e., distance) between these positions is within a predetermined difference, the integrated control unit 38 determines that the measurement state matches the predicted state. In this case, in consideration not only the position of the robot 5 and the peripheral equipment 8 but also the posture thereof, the integrated control unit 38 may determines whether or not the measurement state matches the predicted state. In the second example, the integrated control unit 38 recognizes, as the measurement state, the actual progress degree of the operation sequence (e.g., the number or the percentage (rate) of the completed subtasks) based on the state signals S6 and S7, and recognizes, as the prediction state, the expected progress degree of the operation sequence at the current time step. Then, if these progress degrees match, the integrated control unit 38 determines that the measurement state matches the prediction state.

If the measured state of the robot 5 and the peripheral equipment 8 does not match the predicted state based on the operation sequences (step S23; No), the integrated control unit 38 generates and outputs at least one of the control signal S4 or the control signal S5 (step S25). Thereby, the integrated control unit 38 controls at least one of the robot 5 or the peripheral equipment 8 so that the state of the robot 5 and the peripheral equipment 8 match the predicted state based on the operation sequences. The specific example according to step S25 will be described later.

On the other hand, if the measured state of the robot 5 and the peripheral equipment 8 matches the predicted state based on the operation sequences (step S23; Yes), or after the execution of the process at step S25, the control device 1A determines whether or not the objective task has been completed (step S24). For example, the control device 1A recognizes the state of the target object or the like based on the output signal S3 supplied from the measurement device 7 thereby to determine whether or not the objective task has been completed. In another example, if the control device 1A receives the state signal S6 indicating a normal end of the robot operation sequence Sr from the robot 5, the control device 1A determines that the objective task has been completed. It is noted that only if the control device 1A receives both of the state signal S6 indicating the normal end of the robot operation sequence Sr and the state signal S7 indicating the normal end of the peripheral equipment operation sequence Sp, the control device 1A may determine that the objective task has been completed.

Here, a supplementary description will be given of the process at step S25.

In the first example, if at least one of the state of the robot 5 or the state of the peripheral equipment 8 is delayed from the state predicted based on the operation sequences, the integrated control unit 38 generates at least one of the control signal S4 or the control signal S5 for shifting the completion timing of the entire operation sequence by the delay time. Thus, the integrated control unit 38 suitably prevents the work necessary to synchronize the timing of the robot 5 and the peripheral equipment 8 from not be able to be executed due to the occurrence of any of the operation delay of the robot 5 or the peripheral equipment 8. In this case, for example, the integrated control unit 38 generates the control signal S4 or the control signal S5 which includes information indicating the execution timing of each subtask newly set in consideration of the above-described delay time. In this case, the integrated control unit 38 may instruct one, whose operation progress is more advanced than the other's operation progress, of the robot 5 or the peripheral equipment 8 to delay the operation timing by the operation delay time of the other. In yet another example, the integrated control unit 38 may notify, through the control signal S4 or the control signal S5, the robot 5 and the peripheral equipment 8 of operation sequences in which the execution timing of each newly-set subtask is reflected. If the integrated control unit 38 determines that the objective task cannot be completed regardless of the adjustment of the operation timing of the robot 5 and the peripheral equipment 8, the integrated control unit 38 may instruct the operation sequence generation unit 37 to regenerate the operation sequence.

In the second example, when the integrated control unit 38 detects that either the robot 5 or the peripheral equipment 8 has stopped, the integrated control unit 38 immediately determines that the measurement state of the robot 5 and the peripheral equipment 8 does not match the predicted state based on the operation sequences. In this case, for example, the integrated control unit 38 transmits, to the one that is not stopped, a control signal to instruct the stop of the operation. In another example, the integrated control unit 38 may instruct the operation sequence generation unit 37 to regenerate the operation sequence, or may output a warning for notifying the manager that an abnormality has occurred.

As described above, according to the second example embodiment, the control device 1A can monitor whether or not the robot 5 and the peripheral equipment 8 are operating according to the given subtask sequences, respectively, after the generation of the subtask sequences and control the robot 5 and the peripheral equipment 8 so as to operate according to the subtask sequences.

Third Example Embodiment

Figure 10:
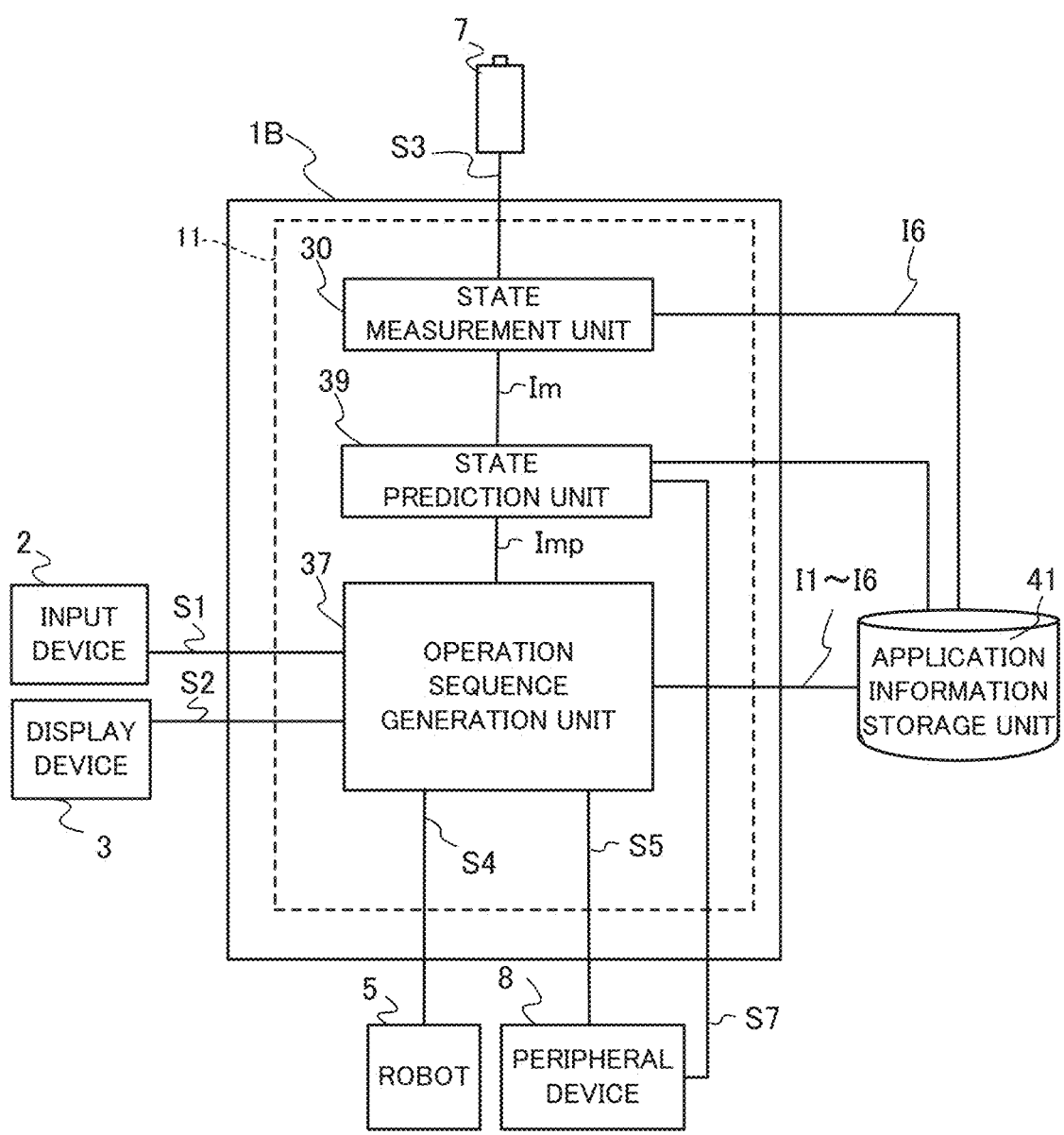
FIG. 10 is an example of a schematic configuration diagram of the control device in the third example embodiment.

FIG. 10 is a schematic configuration diagram of a control device 1B in the third example embodiment. The third example embodiment differs from the first example embodiment in that the control device 1B generates the subtask sequence in accordance with the calculation time of the subtask sequence considering the fact that the target object 61 and the obstacle 62 are moved by the conveyor 82 even during the calculation of the subtask sequence. Hereinafter, the same components as in the first example embodiment are denoted by the same reference numerals as in the first example embodiment, and description thereof will be omitted.

The control device 1B has a hardware configuration shown in FIG. 2 described in the first example embodiment. Then, as shown in FIG. 10, the processor 11 of the control device 1B functionally includes a state measurement unit 30, an operation sequence generation unit 37, and a state prediction unit 39.

The state measurement unit 30 generates, based on the output signal S3 and the object model information I6, the state information Im by performing the same process as the process executed by the state measurement unit 30 according to the first example embodiment, and supplies the state information Im to the state prediction unit 39. The measurement device 7 may execute the process corresponding to the state measurement unit 30 instead.

The state prediction unit 39 generates, based on the state information Im, information (also referred to as "predicted state information Imp") indicating the state of the objects in the workspace 6 after the elapse of a predetermined time (also referred to as "calculation consideration time"). The calculation consideration time is a calculation time predicted to be required for the operation sequence generation unit 37 to calculate the subtask sequence, and is stored in the memory 12 or the storage device 4 in advance.

In this case, the state prediction unit 39 predicts the state, after the predetermined time elapses, of objects (in FIG. 1, the target object 61 and the obstacle 62, also referred to as "mounted objects") mounted on the conveyor 82 extracted from the state of objects indicated by the state information Im. Then, the state prediction unit 39 generates the predicted state information Imp that is the state information Im updated based on the predicted state of the mounted objects. For example, based on the state signal S7 relating to the conveyance speed supplied from the peripheral equipment 8, the state prediction unit 39 predicts the conveyance speed of the peripheral equipment 8 during the calculation of the subtask sequence, and predicts the state of the mounted objects after the elapse of the calculation consideration time based on the predicted conveyance speed and the calculation consideration time.

It is noted that the state prediction unit 39 may determine the conveyance speed of the peripheral equipment 8 to be used for the above-described prediction based on the limit value of the conveyance speed of the peripheral equipment 8 stored in the application information storage unit 41 or the past average value. Further, the state prediction unit 39 may estimate the conveyance speed of the peripheral equipment 8 based on the state information Im generated during the operation of the peripheral equipment 8. In addition, similarly to the conveying speed, the state prediction unit 39 recognizes the conveying direction based on at least one of the state signal S7, the state information Im, or the application information. In addition, if an object other than the mounted objects (for example, the robot 5) is moving, the state prediction unit 39 may predict a state of the object after the elapse of the predetermined time and reflect the predicted result in the predicted state information Imp. In this case, the state prediction unit 39 may perform the detection and the calculation of the movement speed of the moving object based on the optical flow or the like using the difference among the time-series images that are acquired by the measurement device 7 a predetermined time before the generation of the predicted state information Imp.

The operation sequence generation unit 37 generates a robot operation sequence Sr to be executed by the robot 5 and a peripheral equipment operation sequence Sp to be executed by the peripheral equipment 8, respectively, based on the various information stored in the application information storage unit 41 and the predicted state information Imp. Then, the operation sequence generation unit 37 transmits the control signal S4 indicating the robot operation sequence Sr to the robot 5 and transmits the control signal S5 indicating the peripheral equipment operation sequence Sp to the peripheral equipment 8. The operation sequence generation unit 37 is equipped with the functions corresponding to the abstract state setting unit 31, the target logical formula generation unit 32, the time step logical formula generation unit 33, the abstract model generation unit 34, the control input generation unit 35, and the subtask sequence generation unit 36 shown in FIG. 4 in the first example embodiment.

Figure 11:
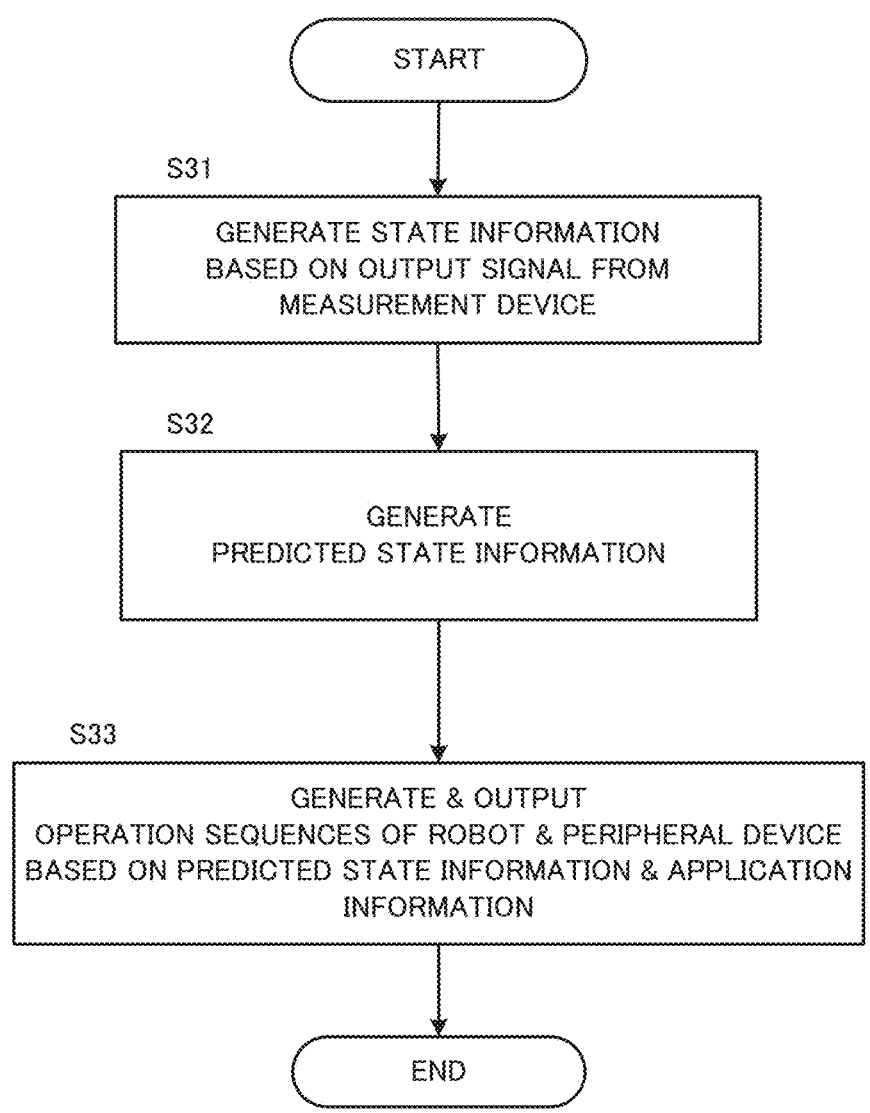
FIG. 11 is an example of a flowchart showing a control process related to the robot and the peripheral equipment in the third example embodiment.

FIG. 11 is an example of a flowchart illustrating a control process of the robot 5 and the peripheral equipment 8 executed by the control device 1B in the third example embodiment.

First, the state measurement unit 30 generates, based on the output signal S3 supplied from the measurement device 7, the state information Im indicating the measurement result of the objects in the workspace 6 (step S31). Then, the state prediction unit 39 generates the predicted state information Imp indicating the state of each object of the workspace 6 after the elapse of the calculation consideration time based on the state information Im (step S32). Then, the operation sequence generation unit 37 generates the robot operation sequence Sr and the peripheral equipment operation sequence Sp based on the predicted state information Imp and the application information, and outputs these operation sequences to the robot 5 and to the peripheral equipment 8 (step S33). In this case, the operation sequence generation unit 37 supplies the control signal S4 indicating the robot operation sequence Sr in consideration of the calculation time of the operation sequence to the robot 5, and supplies the control signal S5 indicating the peripheral equipment operation sequence Sp in consideration of the calculation time of the operation sequence to the peripheral equipment 8.

The third example embodiment may be combined with the second example embodiment. In this case, the processor 11 illustrated in FIG. 10 further functions as the integrated control unit 38 to control the robot 5 and the peripheral equipment 8 so that the state of the robot 5 and the peripheral equipment 8 matches the predicted state thereof based on the subtask sequence.

Fourth Example Embodiment

Figure 12:
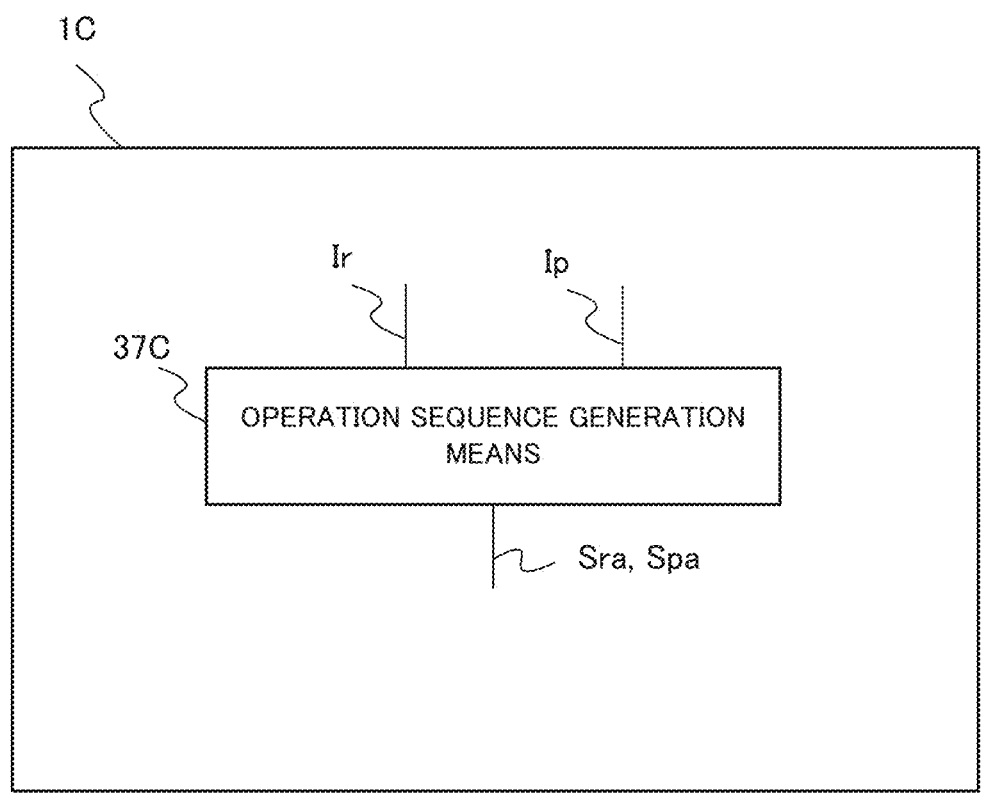
FIG. 12 is a schematic configuration diagram of the control device in the fourth example embodiment.

FIG. 12 is a schematic configuration diagram of a control device 1C in the fourth example embodiment. As shown in FIG. 12, the control device 1C includes an operation sequence generation means 37C.

The operation sequence generation means 37C is configured to generate, based on robot operation information "Ir" indicating operation characteristics of a robot executing a task and peripheral equipment information "Ip" indicating operation characteristics of peripheral equipment which delivers or receives an object relating to the task to or from the robot, operation sequences "Sra" and "Spa" indicating operations to be executed by the robot and the peripheral equipment, respectively.

In this case, the term "robot" herein indicates any type of robots configured to execute a task using an object. Further, the term "peripheral equipment" herein indicates equipment configured to deliver or receive an object relating to the task to or from a robot, and it may be a conveyor or AGV for conveying an object, or it may be an industrial device configured to deliver or receive a tool or a part to or from a robot in an assembly factory or the like. The term "object" herein indicates an object to be handed over between the robot and the peripheral equipment and examples thereof include a tool, a component (member), or a box for accommodating them.

The robot operation information Ir is information (e.g., the constraint condition information I2, the operation limit information I3, the subtask information I4, the abstract model information I5) relating to the operation characteristics of the robot 5 extracted from the application information in the first to third example embodiments. Further, the peripheral equipment information Ip is information (i.e., the constraint condition information I2, the operation limit information I3, the subtask information I4, and the abstract model information I5) relating to the operation characteristics of the peripheral equipment 8 extracted from the application information in the first to third example embodiments. For example, the operation sequence generation unit 37C can be configured by the abstract state setting unit 31, the target logical formula generation unit 32, the time step logical formula generation unit 33, the abstract model generation unit 34, the control input generation unit 35, and the subtask sequence generation unit 36 in the first example embodiment. The operation sequence generation unit 37C may be configured by the operation sequence generation unit 37 in the second example embodiment or the third example embodiment. The operation sequences Spa and Spa may be subtask sequences generated by the subtask sequence generation unit 36 in the first example embodiment, or may be the robot operation sequence Sr and the peripheral equipment operation sequence Sp generated by the operation sequence generation unit 37 in the second example embodiment or the third example embodiment.

Figure 13:
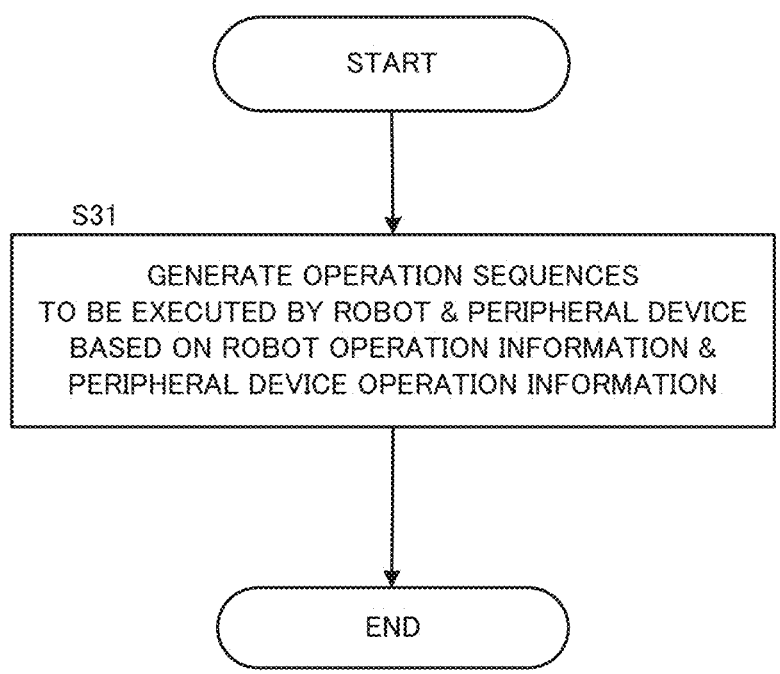
FIG. 13 is an example of a flowchart showing a control process related to the robot and the peripheral equipment in the fourth example embodiment.

FIG. 13 is an example of a flowchart executed by the control device 1C in the fourth example embodiment. The operation sequence generating means 37C generates, based on the robot operation information Ir and the peripheral equipment information Ip, the operation sequences Sra and Spa which indicate the operations to be executed by the robot and the peripheral equipment, respectively (step S31).

According to the configuration of the fourth example embodiment, the control device 1C can suitably generate the operation sequences of the robots and peripheral equipment required to perform a task.

In the example embodiments described above, the program is stored by any type of a non-transitory computer-readable medium (non-transitory computer readable medium) and can be supplied to a processor or the like that is a computer. The non-transitory computer-readable medium include any type of a tangible storage medium. Examples of the non-transitory computer readable medium include a magnetic storage medium (e.g., a flexible disk, a magnetic tape, a hard disk drive), a magnetic-optical storage medium (e.g., a magnetic optical disk), CD-ROM (Read Only Memory), CD-R, CD-R/W, a solid-state memory (e.g., a mask ROM, a PROM (Programmable ROM), an EPROM (Erasable PROM), a flash ROM, a RAM (Random Access Memory)). The program may also be provided to the computer by any type of a transitory computer readable medium. Examples of the transitory computer readable medium include an electrical signal, an optical signal, and an electromagnetic wave. The transitory computer readable medium can provide the program to the computer through a wired channel such as wires and optical fibers or a wireless channel.

The whole or a part of the example embodiments described above can be described as, but not limited to, the following Supplementary Notes.

[Supplementary Note 1]

A control device comprising
an operation sequence generation means configured to generate, based on
robot operation information indicating operation characteristics of a robot executing a task and
peripheral equipment information indicating operation characteristics of peripheral equipment which delivers or receives an object relating to the task to or from the robot,
operation sequences indicating operations to be executed by the robot and the peripheral equipment, respectively.

[Supplementary Note 2]

The control device according to Supplementary Note 1, further comprising
an integrated control means configured to control the operations to be executed by the robot and the peripheral equipment based on
the operation sequences and
states of the robot and the peripheral equipment measured during execution of the operation sequences.

[Supplementary Note 3]

The control device according to Supplementary Note 2, wherein the integrated control means is configured, if the states of the robot and the peripheral equipment do not match predicted states of the robot and the peripheral equipment which operate according to the operation sequences, to adjust an operation timing of at least one of the robot or the peripheral equipment.

[Supplementary Note 4]

The control device according to any one of Supplementary Notes 1 to 3, further comprising a state prediction means configured to predict a state of the robot after elapse of a predetermined time in the workspace, wherein the operation sequence generation means is configured to generate the operation sequences based on the state predicted by the state prediction means, the robot operation information, and the peripheral equipment operation information.

[Supplementary Note 5]

The control device according to Supplementary Note 4, wherein the predetermined time is set to a predicted calculation time to be required for calculation of the operation sequences by the operation sequence generation means.

[Supplementary Note 6]

The control device according to any one of Supplementary Notes 1 to 5, wherein the robot operation information includes at least one of operation limit information relating to an operation limit of the robot, subtask information indicating subtasks executable by the robot, abstract model information relating to a model in which dynamics relating to the robot are abstracted, and wherein the peripheral equipment operation information includes at least one of operation limit information relating to an operation limit of the peripheral equipment, subtask information indicating subtasks executable by the peripheral equipment, abstract model information relating to a model in which dynamics relating to the peripheral equipment are abstracted.

[Supplementary Note 7]

The control device according to Supplementary Note 6, wherein the abstract model information included in the robot operation information includes information indicating a condition of switching the dynamics relating to the robot, and wherein the abstract model information included in the peripheral equipment operation information includes information indicating a condition of switching the dynamics relating to the peripheral equipment.

[Supplementary Note 8]

The control device according to any one of Supplementary Notes 1 to 7, wherein the peripheral equipment is a conveyor configured to convey the object, and wherein the robot is a robot at least configured to pick up the object.

[Supplementary Note 9]

The control device according to any one of Supplementary Notes 1 to 8, wherein the operation sequence generation means is configured to display an image obtained by image of a workspace of the robot on a display device thereby to accept an input specifying the object or a type of the object, and generate the operation sequences based on the input.

[Supplementary Note 10]

The control device according to any one of Supplementary Notes 1 to 9, wherein the operation sequence generation means comprises:

a logical formula conversion means configured to convert the task into a logical formula based on a temporal logic;

a time step logical formula generation means configured to generate, from the logical formula, a time step logical formula that is a logical formula representing states at each time step for completing the task; and a subtask sequence generation means configured to generate, based on the time step logical formula, sequences of subtasks to be executed by the robot and the peripheral equipment as the operation sequences, respectively.

[Supplementary Note 11]

A control method executed by a computer, the control method comprising:

generating, based on robot operation information indicating operation characteristics of a robot executing a task and peripheral equipment information indicating operation characteristics of peripheral equipment which delivers or receives an object relating to the task to or from the robot, operation sequences indicating operations to be executed by the robot and the peripheral equipment, respectively.

[Supplementary Note 12]

A storage medium storing a program executed by a computer, the program causing the computer to function as:

an operation sequence generation means configured to generate, based on robot operation information indicating operation characteristics of a robot executing a task and peripheral equipment information indicating operation characteristics of peripheral equipment which delivers or receives an object relating to the task to or from the robot, operation sequences indicating operations to be executed by the robot and the peripheral equipment, respectively.

While the invention has been particularly shown and described with reference to example embodiments thereof, the invention is not limited to these example embodiments. It will be understood by those of ordinary skilled in the art that various changes in form and details may be made therein without departing from the spirit and scope of the present invention as defined by the claims. In other words, it is needless to say that the present invention includes various modifications that could be made by a person skilled in the art according to the entire disclosure including the scope of the claims, and the technical philosophy. All Patent and Non-Patent Literatures mentioned in this specification are incorporated by reference in its entirety.

DESCRIPTION OF REFERENCE NUMERALS 1, 1A to 1C Control device
2 Input device
3 Display device
4 Storage device
5 Robot
6 Workspace
7 Measurement device
8 Peripheral equipment
41 Application information storage unit
100 Control system

What is claimed is:

1. A control device comprising
at least one memory storing instructions; and
at least one processor configured to execute the instructions to:
generate time step-based operation sequences indicating operations to be executed by a robot executing a task and peripheral equipment that delivers or receives an object relating to the task to or from the robot, based on:
robot operation information indicating operation characteristics of the robot executing the task; and
peripheral equipment information indicating operation characteristics of the peripheral equipment that delivers or receives the object relating to the task to or from the robot;
generate control signals to control the robot and the peripheral equipment based on:
the operation sequences; and
states of the robot and the peripheral equipment measured during execution of the operation sequences;
provide the control signals to the robot and the peripheral equipment;
predict states of the robot and the peripheral equipment according to the operation sequences;
recognize an actual progress degree of the operation sequences based on a number of completed subtasks;
determine, based on the actual progress degree and an expected progress degree of the operation sequences at a current time step, whether or not the measured states match the predicted states;
regenerate, upon determining that the measured states do not match predicted states, a control signal to control the robot and/or the peripheral equipment to adjust an operation timing of at least one of the robot or the peripheral equipment, and provide the regenerated control signal to the robot and/or the peripheral equipment;
convert the task into a logical formula based on a temporal logic, by:
setting a number of time steps for completing the task;
determining, from a target logical formula, a plurality of candidate combinations of propositions, the propositions, in each candidate combination, each representing a state at each time step, such that each candidate combination satisfies the target logical formula with the set number of times, each candidate combination being a candidate of a logical formula representing a sequence of operations to be instructed to the robot;
generating a time step logical formula in which the candidate combinations are combined; and
generating, based on the time step logical formula, sequences of subtasks to be executed by the robot and the peripheral equipment as the operation sequences, respectively.

2. The control device according to claim 1, wherein the at least one processor is further configured to execute the instructions to:
predict a state of the robot after elapse of a predetermined time in a workspace; and
generate the operation sequences based on the predicted state, the robot operation information, and the peripheral equipment operation information.

3. The control device according to claim 2, wherein the predetermined time is set to a predicted calculation time required for calculation of the operation sequences.

4. The control device according to claim 1, wherein the robot operation information includes at least one of:
operation limit information relating to an operation limit of the robot;
subtask information indicating subtasks executable by the robot; and
abstract model information relating to a model in which dynamics relating to the robot are abstracted,
wherein the peripheral equipment operation information includes at least one of:
operation limit information relating to an operation limit of the peripheral equipment;
subtask information indicating subtasks executable by the peripheral equipment; and
abstract model information relating to a model in which dynamics relating to the peripheral equipment are abstracted.

5. The control device according to claim 4, wherein the abstract model information included in the robot operation information includes information indicating a condition of switching the dynamics relating to the robot, and
wherein the abstract model information included in the peripheral equipment operation information includes information indicating a condition of switching the dynamics relating to the peripheral equipment.

6. The control device according to claim 1, wherein the peripheral equipment is a conveyor configured to convey the object, and
wherein the robot is a robot at least configured to pick up the object.

7. The control device according to claim 1, wherein the at least one processor is configured to execute the instructions to:
display an image obtained by capturing an image of a workspace of the robot on a display device and accept an input specifying the object or a type of the object; and
generate the operation sequences based on the input.

8. A control method performed by a computer and comprising:
generating time step-based operation sequences indicating operations to be executed by a robot executing a task and peripheral equipment that delivers or receives an object relating to the task to or from the robot, based on:
robot operation information indicating operation characteristics of the robot executing the task; and
peripheral equipment information indicating operation characteristics of the peripheral equipment that delivers or receives the object relating to the task to or from the robot;

generating control signals to control the robot and the peripheral equipment based on:
  the operation sequences; and
  states of the robot and the peripheral equipment measured during execution of the operation sequences;
providing the control signals to the robot and the peripheral equipment;
predicting states of the robot and the peripheral equipment according to the operation sequences;
recognizing an actual progress degree of the operation sequences based on a number of completed subtasks;
determining, based on the actual progress degree and an expected progress degree of the operation sequences at a current time step, whether or not the measured states match the predicted states;
regenerating, upon determining that the measured states do not match predicted states, a control signal to control the robot and/or the peripheral equipment to adjust an operation timing of at least one of the robot or the peripheral equipment, and provide the regenerated control signal to the robot and/or the peripheral equipment;
converting the task into a logical formula based on a temporal logic, by:
  setting a number of time steps for completing the task;
determining, from a target logical formula, a plurality of candidate combinations of propositions, the propositions, in each candidate combination, each representing a state at each time step, such that each candidate combination satisfies the target logical formula with the set number of times, each candidate combination being a candidate of a logical formula representing a sequence of operations to be instructed to the robot;
  generating a time step logical formula in which the candidate combinations are combined; and
  generating, based on the time step logical formula, sequences of subtasks to be executed by the robot and the peripheral equipment as the operation sequences, respectively.

9. A non-transitory computer readable storage medium storing a program executable by a computer to:
  generate time step-based operation sequences indicating operations to be executed by a robot executing a task and peripheral equipment that delivers or receives an object relating to the task to or from the robot, based on:
    robot operation information indicating operation characteristics of the robot executing the task; and
    peripheral equipment information indicating operation characteristics of the peripheral equipment that delivers or receives the object relating to the task to or from the robot;
  generate control signals to control the robot and the peripheral equipment based on:
    the operation sequences; and
    states of the robot and the peripheral equipment measured during execution of the operation sequences; provide the control signals to the robot and the peripheral equipment; predict states of the robot and the peripheral equipment according to the operation sequences;
  recognize an actual progress degree of the operation sequences based on a number of completed subtasks;
  determine, based on the actual progress degree and an expected progress degree of the operation sequences at a current time step, whether or not the measured states match the predicted states;
  regenerate, upon determining that the measured states do not match predicted states, a control signal to control the robot and/or the peripheral equipment to adjust an operation timing of at least one of the robot or the peripheral equipment, and provide the regenerated control signal to the robot and/or the peripheral equipment;
  convert the task into a logical formula based on a temporal logic, by:
    setting a number of time steps for completing the task;
  determining, from a target logical formula, a plurality of candidate combinations of propositions, the propositions, in each candidate combination, each representing a state at each time step, such that each candidate combination satisfies the target logical formula with the set number of times, each candidate combination being a candidate of a logical formula representing a sequence of operations to be instructed to the robot;
    generating a time step logical formula in which the candidate combinations are combined; and
    generating, based on the time step logical formula, sequences of subtasks to be executed by the robot and the peripheral equipment as the operation sequences, respectively.

\* \* \* \* \*